US006944161B2

(12) United States Patent
Sandell

(10) Patent No.: US 6,944,161 B2
(45) Date of Patent: Sep. 13, 2005

(54) METHOD AND DEVICE FOR ASSIGNING CELL DATA UNITS TO SEQUENTIAL STORAGE POSITIONS OF DATA FRAMES USING A POINTER POSITION ESTIMATION

(75) Inventor: Patrik Sandell, Gustavsberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 478 days.

(21) Appl. No.: 10/050,839

(22) Filed: Jan. 18, 2002

(65) Prior Publication Data

US 2002/0131417 A1 Sep. 19, 2002

(30) Foreign Application Priority Data

Jan. 19, 2001 (EP) .............................. 01101134

(51) Int. Cl.[7] .............................................. H04L 12/56
(52) U.S. Cl. ...................... 370/395.1; 370/395; 370/61; 370/474
(58) Field of Search ................................ 370/351, 352, 370/353, 354, 355, 356, 357, 389, 394, 395.1, 395.6–395.65, 401, 465, 470–476

(56) References Cited

U.S. PATENT DOCUMENTS

| 5,844,891 A | 12/1998 | Cox |
| 5,848,067 A | 12/1998 | Osawa et al. |
| 5,912,880 A | 6/1999 | Bernstein |
| 6,088,355 A | 7/2000 | Mills et al. |
| 6,094,432 A | 7/2000 | Jeong |

FOREIGN PATENT DOCUMENTS

| DE | 19644238 | 4/1998 |
| DE | 19809190 | 10/1998 |
| EP | 0915587 A2 | 5/1999 |
| EP | 1009193 | 6/2000 |
| JP | 004098943 | 3/1992 |
| JP | 005336154 | 12/1993 |
| JP | 006268688 | 9/1994 |
| JP | J0008204712 | 8/1996 |
| JP | 09055746 A | 2/1997 |
| JP | J0010336199 | 12/1998 |
| WO | WO99/08409 | 2/1999 |

OTHER PUBLICATIONS

AF–VTOA–0078.000, Circuit Emulation Service, The ATM Forum, pp. 1–93, 1997.*
ITU–T Telecommunication Standardization Sector of ITR; 1.363.1 (08/96): Series I: Integrated Services Digital Network; Overall network aspects and functions—Protocol layer requirements. B–ISDN ATM Adaptation Layer specification: Type 1 AAL.

* cited by examiner

*Primary Examiner*—Dang Ton
*Assistant Examiner*—Frank Duong

(57) ABSTRACT

In a communication system (SYS) circuit switched data frames (DF) are disassembled into ATM cells (CL), routed through an ATM routing network (RN) and cell data is reassembled into data frames (DF) by a frame assembly device (FAD). Second type cells including a pointer value (PTR) are normally included in the cell stream (CS) received from the ATM routing network (RN). This pointer value (PTR) indicates the delimitation position, i.e. the number of data units belonging to a current frame (DF) and to a next frame (DF'). In order to avoid a loss of data units of a complete frame when such a second type cell (STC) is lost during the transmission, the invention estimates the sequence number of the missing second type cell as well as the pointer value (PTR'). The pre-estimation of the pointer value (PTR') can be done by continuously updating a respective counter assigned to a respective sequence number (SN) of a cell block (CB). Thus, instead of losing the complete data of a whole frame, due to lack of information of where the delimitation occurs, in accordance with the invention only the data units of the missing second type cell are replaced with dummy data units (AIS) in the data frame (DF, DF').

7 Claims, 18 Drawing Sheets a) NON-P FORMAT

T1817650-92 b) P FORMAT

FIG.4c PRIOR ART

| 49th CELL | ATM HEADER | SN=0 | PAYLOAD #2250-2296 | |
|---|---|---|---|---|
| 50th CELL | ATM HEADER | SN=1 | PAYLOAD #2297-2343 | |
| 51th CELL | ATM HEADER | SN=2 PTR.=14 | PAYLOAD #2344-2357 #0-31 | |
| 52nd CELL | ATM HEADER | SN=3 | PAYLOAD #32-78 | CB |
| 53rd CELL | ATM HEADER | SN=4 | PAYLOAD #79-125 | |
| 54th CELL | ATM HEADER | SN=5 | PAYLOAD #126-172 | |
| 55th CELL | ATM HEADER | SN=6 | PAYLOAD #173-219 | |
| 56th CELL | ATM HEADER | SN=7 | PAYLOAD #220-266 | |

FIG.4d PRIOR ART

| Nth CELL | ATM HEADER | SN=0 | PAYLOAD #2110-2156 | |
|---|---|---|---|---|
| N+1st CELL | ATM HEADER | SN=1 | PAYLOAD #2157-2203 | |
| N+2nd CELL | ATM HEADER | SN=2 | PAYLOAD #2204-2250 | |
| N+3rd CELL | ATM HEADER | SN=3 | PAYLOAD #2251-2297 | |
| N+4th CELL | ATM HEADER | SN=4 PTR.=60 | PAYLOAD #2298-2343 | CB |
| N+5th CELL | ATM HEADER | SN=5 | PAYLOAD #2344-2357 #0-32 | |
| N+6th CELL | ATM HEADER | SN=6 | PAYLOAD #33-79 | |
| N+7th CELL | ATM HEADER | SN=7 | PAYLOAD #80-126 | |

FIG. 4e PRIOR ART

| | | | | |
|---|---|---|---|---|
| Nth CELL | ATM HEADER | SN=0 | | AU-4 #1 |
| N+1st CELL | ATM HEADER | SN=1 | | AU-4 #1 |
| N+2nd CELL | ATM HEADER | SN=2 | | AU-4 #1 |
| N+3rd CELL | ATM HEADER | SN=3 | | AU-4 #1 |
| N+4th CELL | ATM HEADER | SN=4 | | AU-4 #1 |
| N+5th CELL | ATM HEADER | SN=5 | | AU-4 #1 |
| N+6th CELL | ATM HEADER | SN=6 | PTR.=93 | AU-4 #1 |
| N+7th CELL | ATM HEADER | SN=7 | | AU-4 #1 |

| | | | | |
|---|---|---|---|---|
| 1st CELL | ATM HEADER | SN=0 | PTR.=0 | AU-4 #2 |
| 2nd CELL | ATM HEADER | SN=1 | | AU-4 #2 |
| 3rd CELL | ATM HEADER | SN=2 | | AU-4 #2 |
| 4th CELL | ATM HEADER | SN=3 | | AU-4 #2 |
| 5th CELL | ATM HEADER | SN=4 | | AU-4 #2 |
| 6th CELL | ATM HEADER | SN=5 | | AU-4 #2 |
| 7th CELL | ATM HEADER | SN=6 | | AU-4 #2 |
| 8th CELL | ATM HEADER | SN=7 | | AU-4 #2 |

} CB

| Nth CELL | ATM HEADER | SN=0 | | PAYLOAD #2110-2156 |
|---|---|---|---|---|
| N+1st CELL | ATM HEADER | SN=1 | | PAYLOAD #2157-2203 |
| N+2nd CELL | ATM HEADER | SN=2 | | PAYLOAD #2204-2250 |
| N+3rd CELL | ATM HEADER | SN=3 | | PAYLOAD #2251-2297 |
| N+4th CELL | ATM HEADER | SN=4 | PTR.=60 | PAYLOAD #2298-2343 |
| N+5th CELL | ATM HEADER | SN=5 | | PAYLOAD #2344-2357, #0-32 |
| N+6th CELL | ATM HEADER | SN=6 | | PAYLOAD #33-79 |
| N+7th CELL | ATM HEADER | SN=7 | | PAYLOAD #80-126 |

CB

REASSEMBLED AU-4

AIS

DF e.g. CELL SN=1 IN CB IS LOST

| 9th CELL | ATM HEADER | SN=0 | PAYLOAD #375-421 | |
|---|---|---|---|---|
| 10th CELL | ATM HEADER | SN=1 | PAYLOAD #422-468 | |
| 11th CELL | ATM HEADER | SN=2 | PAYLOAD #469-515 | |
| 12th CELL | ATM HEADER | SN=3 | PAYLOAD #516-562 | CB |
| 13th CELL | ATM HEADER | SN=4 | PAYLOAD #563-609 | |
| 14th CELL | ATM HEADER | SN=5 | PAYLOAD #610-656 | |
| 15th CELL | ATM HEADER | SN=6 | NP PAYLOAD #657-702 | |
| 16th CELL | ATM HEADER | SN=7 | PAYLOAD #703-749 | | e.g. CELL (DUMMY CELL) SN=6 OF CB IS LOST

| | | | | |
|---|---|---|---|---|
| Nth CELL | ATM HEADER | SN=0 | PAYLOAD #2110-2156 | |
| N+1st CELL | ATM HEADER | SN=1 | PAYLOAD #2157-2203 | |
| N+2nd CELL | ATM HEADER | SN=2 | PAYLOAD #2204-2250 | |
| N+3rd CELL | ATM HEADER | SN=3 | PAYLOAD #2251-2297 | |
| N+4th CELL | ATM HEADER | SN=4 | PTR.=60 | PAYLOAD #2298-2343 |
| N+5th CELL | ATM HEADER | SN=5 | PAYLOAD #2344-2357, #0-32 | |
| N+6th CELL | ATM HEADER | SN=6 | PAYLOAD #33-79 | |
| N+7th CELL | ATM HEADER | SN=7 | PAYLOAD #80-126 | |

CB

REASSEMBLED AU-4 ~ DF

AIS

FIG.8a

| | | | | |
|---|---|---|---|---|
| 1st CELL | ATM HEADER | SN=0 | PTR.=0 | PAYLOAD #0-45 |
| 2nd CELL | ATM HEADER | SN=1 | | PAYLOAD #46-92 |
| 3rd CELL | ATM HEADER | SN=2 | | PAYLOAD #93-139 |
| 4th CELL | ATM HEADER | SN=3 | | PAYLOAD #140-186 |
| 5th CELL | ATM HEADER | SN=4 | | PAYLOAD #187-233 |
| 6th CELL | ATM HEADER | SN=5 | | PAYLOAD #234-280 |
| 7th CELL | ATM HEADER | SN=6 | | PAYLOAD #281-327 |
| 8th CELL | ATM HEADER | SN=7 | | PAYLOAD #328-374 |

⎫ CB1

| | | | | |
|---|---|---|---|---|
| 9th CELL | ATM HEADER | SN=0 | | PAYLOAD #375-421 |
| 10th CELL | ATM HEADER | SN=1 | | PAYLOAD #422-468 |
| 11th CELL | ATM HEADER | SN=2 | | PAYLOAD #469-515 |
| 12th CELL | ATM HEADER | SN=3 | | PAYLOAD #516-562 |
| 13th CELL | ATM HEADER | SN=4 | | PAYLOAD #563-609 |
| 14th CELL | ATM HEADER | SN=5 | | PAYLOAD #610-656 |
| 15th CELL | ATM HEADER | SN=6 | NP | PAYLOAD #657-702 |
| 16th CELL | ATM HEADER | SN=7 | | PAYLOAD #703-749 |

⎫ CB2

| CELL # /SN | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 0 | 2358 | 1983* | | | | | | | 1608 | | | | | | | |
| 1 | 2312 | | 1936 | | | | | | | 1561 | | | | | | |
| 2 | 2265 | | | 1889 | | | | | | | 1514 | | | | | |
| 3 | 2218 | | | | 1842 | | | | | | | 1467 | | | | |
| 4 | 2171 | | | | | 1795 | | | | | | | 1420 | | | |
| 5 | 2124 | | | | | | 1748 | | | | | | | 1373 | | |
| 6 | 2077 | | | | | | | 1702 | | | | | | | 1327* | |
| 7 | 2030 | | | | | | | | 1655 | | | | | | | 1280 |

* = POINTER CELL OR DUMMY POINTER CELL RECEIVED

FIG.8b

| 49th CELL | ATM HEADER | SN=0 | | PAYLOAD #2250-2296 |
|---|---|---|---|---|
| 50th CELL | ATM HEADER | SN=1 | | PAYLOAD #2297-2343 |
| 51th CELL | ATM HEADER | SN=2 | PTR.=14 | PAYLOAD #2344-2357, #0-31 |
| 52nd CELL | ATM HEADER | SN=3 | | PAYLOAD #32-78 |
| 53rd CELL | ATM HEADER | SN=4 | | PAYLOAD #79-125 |
| 54th CELL | ATM HEADER | SN=5 | | PAYLOAD #126-172 |
| 55th CELL | ATM HEADER | SN=6 | | PAYLOAD #173-219 |
| 56th CELL | ATM HEADER | SN=7 | | PAYLOAD #220-266 |

⎫CBn

| CELL # /SN | 49 | 50 | 51 | 52 | 53 | 54 | 55 | 56 |
|---|---|---|---|---|---|---|---|---|
| 0 | 108 | 2091 | | | | | | |
| 1 | 61 | | 2044 | | | | | |
| 2 | 14 | | | 1997 * | | | | |
| 3 | 2326 | | | | 1950 | | | |
| 4 | 2279 | | | | | 1903 | | |
| 5 | 2232 | | | | | | 1856 | |
| 6 | 2185 | | | | | | | 1810 |
| 7 | 2138 | | | | | | | 1763 |

FIG.8c

| | | | |
|---|---|---|---|
| Nth CELL | ATM HEADER | SN=0 | PAYLOAD #2110-2156 |
| N+1st CELL | ATM HEADER | SN=1 | PAYLOAD #2157-2203 |
| N+2nd CELL | ATM HEADER | SN=2 | PAYLOAD #2204-2250 |
| N+3rd CELL | ATM HEADER | SN=3 | PAYLOAD #2251-2297 |
| N+4th CELL | ATM HEADER | SN=4 | PTR.=60  PAYLOAD #2298-2343 |
| N+5th CELL | ATM HEADER | SN=5 | PAYLOAD #2344-2357, #0-32 |
| N+6th CELL | ATM HEADER | SN=6 | PAYLOAD #33-79 |
| N+7th CELL | ATM HEADER | SN=7 | PAYLOAD #80-126 |

}CB

```
CELL #   N    N+1   N+2   N+3   N+4   N+5   N+6   N+7
/SN
0       248  2231
1       201        2184
2       154              2137
3       107                    2090
4        60                          2043*
5        14                                1996
6      2325                                      1950
7      2278                                            1903
```

FIG.8d

| | | | |
|---|---|---|---|
| Nth CELL | ATM HEADER | SN=0 | AU-4 #1 |
| N+1st CELL | ATM HEADER | SN=1 | AU-4 #1 |
| N+2nd CELL | ATM HEADER | SN=2 | AU-4 #1 |
| N+3rd CELL | ATM HEADER | SN=3 | AU-4 #1 |
| N+4th CELL | ATM HEADER | SN=4 | AU-4 #1 |
| N+5th CELL | ATM HEADER | SN=5 | AU-4 #1 |
| N+6th CELL | ATM HEADER | SN=6 PTR.=93 | AU-4 #1 |
| N+7th CELL | ATM HEADER | SN=7 | AU-4 #1 |

}CB

| CELL #/SN | N | N+1 | N+2 | N+3 | N+4 | N+5 | N+6 | N+7 |
|---|---|---|---|---|---|---|---|---|
| 0 | 375 | 2358 | | | | | | |
| 1 | 328 | | 2311 | | | | | |
| 2 | 281 | | | 2264 | | | | |
| 3 | 234 | | | | 2217 | | | |
| 4 | 187 | | | | | 2170 | | |
| 5 | 140 | | | | | | 2123 | |
| 6 | 93 | | | | | | | 2077* |
| 7 | 47 | | | | | | | 2030 |

FIG.8e

| Nth CELL | ATM HEADER | SN=0 | | PAYLOAD #2110-2156 |
|---|---|---|---|---|
| N+1st CELL | ATM HEADER | SN=1 | | PAYLOAD #2157-2203 |
| N+2nd CELL | ATM HEADER | SN=2 | | PAYLOAD #2204-2250 |
| N+3rd CELL | ATM HEADER | SN=3 | | PAYLOAD #2251-2297 |
| N+4th CELL | ATM HEADER | SN=4 | PTR.=60 | PAYLOAD #2298-2343 |
| N+5th CELL | ATM HEADER | SN=5 | | PAYLOAD #2344-2357, #0-32 |
| N+6th CELL | ATM HEADER | SN=6 | | PAYLOAD #33-79 |
| N+7th CELL | ATM HEADER | SN=7 | | PAYLOAD #80-126 |

}CB

| CELL # /SN | N | N+1 | N+2 | N+3 | N+4 | N+5 | N+6 | N+7 |
|---|---|---|---|---|---|---|---|---|
| 0 | 248 | 2231 | | | | | | |
| 1 | 201 | | 2184 | | | | | |
| 2 | 154 | | | ** | 2137 | | | |
| 3 | 107 | | | | 2090 | | | |
| 4 | 60 | | | | | 2043* | | |
| 5 | 14 | | | | | | 1996 | |
| 6 | 2325 | | | | | | | 1950 |
| 7 | 2278 | | | | | | | | 1903 |

** = SINCE CELL N+2 IS LOST, THE COUNTER VALUE UPDATED. THIS IS HOWEVER DONE WHEN NEXT CELL ARRIVES. WE WILL NOT LOOSE ANY DATE SINCE ALL COUNTER VALUES ARE BASED (IN THIS EXAMPLE WHEN CELL N+3 ARRIVES) ON THE VALUE 107.

US 6,944,161 B2

METHOD AND DEVICE FOR ASSIGNING CELL DATA UNITS TO SEQUENTIAL STORAGE POSITIONS OF DATA FRAMES USING A POINTER POSITION ESTIMATION

This application claims priority under 35 U.S.C. §§119 and/or 365 to 01101134.3 filed in Europe on Jan. 19, 2001; the entire content of which is hereby incorporated by reference.

FIELD OF THE INVENTION

The invention relates to a method and a device for assigning data units contained in successive cells of a cell stream to sequential storage positions of successive data frames of a data frame stream, wherein each of said data frames contains a predetermined number of data units and said cell stream is organized as sequential cell blocks each with a predetermined number of first type cells and second type cells.

Such a method and such a device are for example used in a system, where the data of (e.g. circuit-switched) data frames is subdivided into cells which are routed through an ATM routing network to a receiving side. The invention in particular relates to recomposing or reassembling the data from individual cells arriving from the output of the ATM routing network into the sequential data frames. That is, the framework of the present invention is to route data of circuit-switched frames as cells through an ATM routing network to be reassembled on the receiving side.

As will be understood hereinafter, in such a system the cells are arranged or organized as sequential cell blocks, whereas in each cell block there are typically first type cells including the data separated from the data frame and one second type cell including a so-called pointer value field. The second type cell also includes data separated from the data frame. The pointer value field is necessary in order to indicate a position within each cell such that it can be determined which portion of the cell belongs to a present data frame and which portion of the cell belongs to the next frame. Thus, the pointer value field acts as some type of delimiter between two succeeding data frames to be generated on the receiving side. Normally, it is essential to have the pointer value field present in each cell block since otherwise the reassembly procedure completely gets out of step because it is not known which data values belong to a present frame and which data values belong to a succeeding frame.

However, due to transmission errors or coding errors during the transmission through the ATM routing network, cells may get lost. Whilst it is not such a big problem to lose some of the first type cells, it indeed is a big problem to lose the second type cell because the delimitation between two frames is not known any longer. The present invention in particular also relates to the problem of how to reassemble the extracted data units from the cells and assign them to the data frames in case a second type cell is missing.

A typical scenario where such an ATM routing of data from circuit-switched frames is used is in systems operating according to ITU-T I.363.1, namely the AAL type 1 (ATM Adaption Layer) functionality using a pointer prediction in STM-1/AU-4 circuit emulation. This system will also be explained hereinafter.

BACKGROUND OF THE INVENTION

FIG. 1 shows a typical scenario as may be present in the AAL1 pointer prediction in STM-1/AU-4 circuit emulation as reflected in the aforementioned ITU-T document "series I: integrated services digital network, B-ISDN ATM adaption layer specification: type 1 AAL.

In FIG. 1 a plurality of data frames DF are generated on a transmitter side A and a plurality of successive data frames DF are received on a receiver side B. As far as the transmitter A and the receiver B are concerned, the data frames DF are circuit-switched data frames DF generated in accordance with some circuit-switched protocol, e.g. a TDMA method.

However, through the communication system SYS the data frames DF are not routed along a single point-to-point connection. As shown in FIG. 1, advantageously an ATM routing network RN as is well-known in this art is used for routing individual cells CL from an input line IL to an output line OL. Within the routing network RN the cells are asynchronously transferred. For this purpose, a cell assembly device CAD on the transmission side and a cell reassembly device or a frame assembly device FAD is used on the reception side. The cell assembly device CAD successively generates cells CL and inserts sequentially data units (octets) from the data frames DF to the successive cells CL. The cells CL are then routed through the ATM routing network RN asynchronously and on the reception side the data units of the cells CL are again reassembled by the frame assembly device FAD into the sequential data frames. As shown in FIG. 1, the cells CL are organized as sequential cell blocks CB each with a predetermined number of cells CL.

In order to build such a communication system SYS as in FIG. 1, where the circuit-switched frames DF are routed as cells through the ATM routing network RN, the ATM adaption layer (AAL) enhances the service provided by the ATM layer to support functions provided by the next higher layer. The AAL performs functions required by a user, control and management planes and supports the mapping between the ATM layer and the next higher layer. As explained in the aforementioned ITU-T document I.363.1 (08/96), there are interactions between the AAL type 1 and the next higher layer and the AAL type 1 and the ATM layer, as well as AAL type 1 peer-to-peer operations. The different combinations of SAR (segmentation and reassembly) sub-layer and CSs (convergence sub-layers) provide different service access points (SAPs) to the layer above the AAL. It is the SAR sub-layer, which takes care of the cell assembly and cell reassembly in the devices CAD and FAD as shown in FIG. 1.

A typical data frame DF which is reassembled by the frame assembly device FAD and from which data units DU are extracted by the cell assembly device CAD on the transmission side, is shown in FIGS. 2a, 2b. The example in FIG. 2a is an SDH/SONNET frame (STM-1/STS-3) (SDH: Synchronous Digital Hierarchy (Europe); SONET: Synchronous Optical NET Work (USA); STM-1: Synchronous Transfer Mode level 1 (Europe); STS-3: Synchronous Tributary Signal level 3 (USA)). This type of frame consists of 9 rows by 270 octets, i.e. 2430 octets. The octets will hereinafter be referred to as data units DU. The nine first columns consists of an SOH (Section OverHead) and a pointer PTR. The pointer PTR is used to find the beginning of payload within the SDH/SONNET frame (this pointer has nothing to do with the ATM AAL1 pointers). The part of the frame that is transferred over the ATM routing network RN in FIG. 1 is the complete data units and the pointer PTR excluding the SOH parts.

Therefore, what is really transferred over the ATM routing network RN is in principle shown in FIG. 2b. That is, what remains after removing the SOH is called an AU-4 (Administrative Unit Level 4) frame. Since the pointer PTR sent together with the payload is of no importance here it will not be referred to separately below. However, as shown in FIG. 2b, the data frame DF contains NF data units DU sequentially arranged at storage positions SP of the data frame DF. If the data frame DF is a AU-4 frame, the size of this frame is 2358 octets (261*9+9). Now, the task is to map the AU-4 frame into ATM AAL1 cells. From here onwards this payload can be seen as a stream of 2358 octets or data units sequentially stored for example row-wise in the data frame DF. As soon as one data frame AU-4 finishes, a new data frame AU-4 starts.

A typical structure of the ATM cells CL is shown in FIGS. 3a, 3b, 3c. As shown in FIG. 3a, the ATM cell comprises a cell header CH, a sequence number field SN indicating the position of the cell CL in the cell block CB and a data portion DP having a number of data units DU. Typically, the data portion comprises 47 octets and the sequence number field SN comprises 1 octet separated in 4 bits for the sequence number field SN and 4 bits for the sequence number protection (SNP) field. Thus, one can say that generally the cells CL comprise a cell header CH and a SAR-PDU data portion (SAR: segmentation and reassembly; PDU: packet data unit) which itself comprises a SAR/PDU header, and a payload portion.

FIG. 3b shows a typical first type cell FTC which, in the context of the AAL1 layer, is called a none-P format. It comprises the sequence number field SN indicating the position of the cell CL in the cell block CB and a first data portion FDP with the first number NDU1=47 data units DU.

FIG. 3c shows a typical second type cell STC which, in the context of the AAL1 layer, is called a P format cell. Typically, it comprises a sequence number field SN indicating the position of the second type cell CL in a cell block CB, a second data portion SDP with a second number NDU2=46 data units, and a so-called pointer value field PVF. As already indicated before, the pointer value field PVF includes at least a data frame delimiter pointer value PTR indicating a number PTR of sequential data units DU of at least the second data portion SDP to be written to a previous data frame DF before data units DU follow which are to be written to a current data frame DF. Depending on the position of the second type cell (the P format cell) in the cell block CB, the pointer value field PVF may also contain a dummy pointer value NP indicating that neither a start nor an end frame occurs in the data block CB in which the second type cell is included or a frame & block end pointer value (PVF=93) indicating that the end of the frame coincides with the end of the data block. In the AAL1 layer, the CSI bit in the 4 bit SN is always set to one to identify P-type cells (STC).

The pointer value field contains the binary value of the offset, measured in octets between the end of the pointer field and the first start of the structured cell block in the 93-octet payload consisting of the remaining 46 octets of this SAR-PDU payload and the 47 octets of the next SAR-PDU payload. This offset ranges, in AAL1, between 0 and 93 inclusive. The offset value 93 is used for the frame & block end pointer value to indicate that the end of the 93-octet payload coincides with the end of the structured block. Furthermore, the dummy pointer value 127 is used when no structure boundary is being indicated. Pointer values can be between 0 and 93, 93 is a pointer indicating that the end of the frame coincides with the end of the cell block, the dummy pointer value is 127 and values of 94–126 are not allowed. Second type cells STC with dummy pointers exist in every cell block CB (where no other STC occurs). The binary value of the offset is inserted right justified in the offset field, i.e. the least significant bit in the offset is transmitted last. The first bit of the pointer field is used to provide an even parity over the pointer field.

The second type cell is used exactly once every cycle (cell block), wherein a cycle is the sequence of 8 consecutive cells with sequence numbers SN 0 through 7. The second type cell is used at the first available opportunity in a cell block to point to a start of a structure boundary between two data frames. For second type cells SN must be even i.e. 0, 2, 4, 8. If neither a start of a structure boundary nor an end of structure boundary is present in a cycle, then the second type cell with the dummy offset value in the pointer field is used at the last opportunity in the cycle, i.e. in a SAR-PDU with a sequence number field value 6. If the above pointer rule is obeyed, the first cell block to be transmitted after the AAL connection is established uses the second type cell with a sequence count value in the SAR-PDU header equal to 0 and with the first octet of the structured data placed in the second octet of the SAR-PDU payload, in the AAL1 frame work of the ITU-T document referred to above.

A typical functional model of the SAR at the transmitting side (side A in FIG. 1) and typical functional model of the SAR at the receiving side (side B in FIG. 1) is shown in Fig. I.1/I.363.1 and Fig. I.2/I.363.1 of the aforementioned ITU-T document I.363.1.

FIGS. 4a–f show typical examples of the positioning of the second type cell (P-type cell) within the sequential cell blocks CB as generally explained above. Thus, FIGS. 4a–f show a complete sequence of cell blocks CB for the data frame DF and the cells respectively shown in FIG. 2 and FIG. 3. The cells schematically indicated in FIG. 1 at the input of the ATM routing network IL and at the output OL generally occur in the manner as shown in FIGS. 4a–f, i.e. there are made provisions within the ATM routing network RN (for example the usage of time stamps etc.) such that the order of the cells CL within the cell block CB and from cell block to cell block is preserved.

Therefore, what is shown in FIGS. 4a–f equally well applies to the transmitting side (input side of the routing network) and the receiving side (output side of the routing network).

In FIGS. 4a–f (and in other following schematic drawings) the reference numeral SN denotes the sequence number of the current cell within the cell block CB, PTR is the pointer value when applicable (it contains an offset to the start of the frame),PTR<93. NP is the dummy field pointer value (pointer value whose value is of no interest=127).

As shown in FIG. 4a, in the first cell block CB the first cell is the second type cell having a pointer value PTR=0. This indicates to the frame assembly device FAD that all the succeeding payload # 0–45 belongs to the current data frame DF. In total 46 data units (payload octets) can be contained in the first cell. That is, when the second type cell STC is received, the sequence number SN is read and the data frame delimiter pointer value PTR of the second type cell STC is also read. The data units from the second data portion SDP is read and are assigned to the first sequential storage positions SP of the current frame DF.

Successively the other eight cells (2nd cell to 8th cell) of the first cell block CB contain the payload data units (#46–92, #93–139, . . . , #328–374). Of course, since the complete frame contains 2358 data units, several more cell blocks CB must occur before the complete frame can be filled with data units from the successively arriving cells.

For example, as shown in FIG. 4b, the second cell block CB does not need a data frame delimiter pointer value PTR because no new frame will start in this cell block. Therefore, e.g. the pointer value receives the value NP=127 and is inserted at the last-1 sequence number (SN=6) in the cell block. Therefore, if the conventions in accordance with AAL1 are obeyed, then the pointer value NP is again inserted in the payload portion and, therefore, the 15th cell only contains 46 payload data units #657–702.

This assignment of cell blocks and dummy pointer values NP is carried out until the cell block CB shown in FIG. 4c occurs. In FIG. 4c the actual transition from a previous data frame to a new data frame occurs. In particular, in the 51th cell all data units up to #2343 have been read and have been sequentially assigned to the sequential storage positions of the previous frame. The pointer value PTR=14 in the second type cell (51th cell) indicates that 14 data units #2344–2357 still belong to the previous frame before the next data units #0–31 are read and assigned to the next data frame. In the case of FIG. 4c, according to the conventions of AAL type 1 of ITU-T and as explained above, a second type cell is only contained in even sequence numbers (SN=2, SN=4, etc.). Therefore, if the end of the data frame (the last data units) happen to fall into an even sequence number SN, then the pointer value PTR will directly indicate in the second type cell how many data units belong to the previous frame and how many sequential data units belong to the next frame.

However, the end of the data frame (the last data units in the cells) may not coincide with a sequence number which is even. FIG. 4d shows in the N+4$^{th}$ cell the value of the pointer PTR=60, if the actual end of the data frame occurs in an odd numbered sequence field SN. It may be understood that even if the length of the data frame stays constant (in total 2358 data units), the end of data frames may alternately lie in odd and even sequence number fields SN, such that both cases must be catered for.

As shown in FIG. 4d, the actual end of the payload #2344–2357 is here assumed to occur in the sequence number SN=5. If the pointer was allowed to sit in odd numbered sequence fields SN, then of course the pointer would have the same value as in FIG. 4c. However, since according to AAL type 1 it cannot sit in odd numbered sequence fields, the pointer must be inserted on the cell before, i.e. in the N+4th cell having the sequence number SN=4. Now, the pointer value PTR=60, i.e. 14+46. The reason is that the pointer always indicates the number of sequential data units (even over more than one succeeding cell) which still need to be assigned to a current frame before data units follow for the next frame. First, 60 is a value which correctly reflects that still 46 data units of the P-type (second type) cell can be read from the N+4th cell and another remaining 14 data units must be read from the succeeding N+5th cell. Only then the #0–32 remaining octets of the N+5th cell will be assigned to the next frame. Second type cells STC including a dummy PTR are handled in exactly the same way as first type cells but with only 46 data units.

FIG. 4e shows another scenario where the end of the data frame coincides with the end of the last cell in a cell block CB. That is, the 2358-th data unit is in fact the last data unit at the last position of the N+7th cell, that is the new frame will start with sequence number SN=0 in the first succeeding cell (1st cell) shown in FIG. 4f. Therefore, in the last but one field the pointer value of PTR=93 is inserted. Therefore, the next 93 data units of the present N+6th cell and another 47 data units of the N+7th cell are sequentially read and the end of the cell N+7 is also the end of the last frame. In FIGS. 4a–f an arrow pointing to the right in a cell always indicates the beginning of a new frame, i.e. from the indicated position onwards data units will be assigned to a new frame.

As can be understood in particular from FIGS. 4a, 4c, 4d and 4e, as long as the pointer value field is present (i.e. it is not lost during transmission), there is no problem because the delimitation from one data frame to the next data frame is always correctly detectable by means of the pointer value PTR.

Therefore, if everything is fine, i.e. if no cell loss occurs, the frame assembly device FAD shown in FIG. 6a can carry out the cell assigning procedure shown in FIG. 6b. That is, the reception unit RC sequentially receives the cells CL and the reception unit RC is adapted to receive in particular a second type cell STC in step S1. This cell can e.g. be the 1st cell shown in FIG. 4a. In step S2 the pointer value PTR of the pointer value field PVF is determined and in step S3 the read unit RD will read from the second data portion DP the last NDU2–PTR data units (NDU2: total number of data units present in a second type cell). An assignment unit WR will in step S3 assign these read NDU2–PTR data units to the first NDU2–PTR sequential storage positions SP of the current data frame.

Thereafter, in steps S4, S5 and S6, if further first type cells FTC (e.g. the 2nd cell to the 50th cell in FIGS. 4a–c) are received, the assignment unit WR will sequentially assign the data read from the first data portion in step S5 to again sequential storage positions of the frame. Such a sequential storage can e.g. be row-by-row, i.e. the assigning or writing starts at the top left corner and goes to the right top corner of the frame and then again moves to the first column position of the next row.

If again in step S6 a second type cell STC is detected, e.g. the 51st cell shown in FIG. 4c, then again the pointer value PTR must be determined in order to detect how many of the data units contained in the 51st cell still belong to the current frame before the succeeding data frames are assigned to the next frame.

Thus, in accordance with the read/write procedure shown in FIG. 6b, the assignment unit WR shown in FIG. 6a assigns the respective data units DU to the sequential storage positions of the data frames DF generated by the data frame generator DFG.

The conventional frame assembly device FAD and the frame assembly method in FIG. 6b also take into account that accidentally some of the first type cells may get lost during the routing through the routing network RN. For this purpose, the frame assembly device FAD comprises a cell failure determination unit CFDU which sends out an alarm ALRM if a cell loss is detected. In ITU-T I.363.1 (AAL type 1) such an indication can be received from a so-called state machine. It may be noted that the alarm ALRM is not only indicating that in principle a cell is lost, but it will also indicate the sequence number SN at which the cell loss occurs.

For example, as shown in FIG. 5a, if an alarm signal ALRM is received at any time during the assignment procedure shown in FIG. 6b, e.g. before or during the step S4 (see the step S4' in FIG. 6b), it is known at which position the cell loss has occurred. Despite the fact that of course the frame assembly device FAD cannot regenerate this data, it can at least indicate some alarm signal AIS (Alarm Indication Signal) at the sequential storage positions corresponding to the lost cell. For example, as shown in FIG. 5a, here it is assumed that a cell loss of a first type cell occurs in the last third of the cells and at the missing data unit storage positions dummy data units AIS are inserted. Whilst FIG. 5 shows only the insertion of AIS units if one cell is lost, it should be noted that also several consecutive cell losses can be handled.

Such a procedure of outputting an alarm which indicates the position of missing data units in the cell block and therefore also indicates storage positions at which it will not be possible to store data units, is in principle also applicable when a second type cell is missing, as shown in FIG. 5b. However, this is only the case if a dummy pointer value NP is missing. As explained above, a dummy pointer value NP is only inserted at the last sequential position in the cell block CB and therefore, if the sequence number SN=6 is indicated as missing by the alarm signal ALARM, then it is clear that only for the complete number of NDU2=46 units dummy data units should be inserted at the sequential storage positions corresponding to those of the last sequence number field SN. Therefore, when a dummy pointer cell is lost, the AIS dummy data units can still be inserted in the space where data from the lost cell should be present.

However, as shown in FIG. 5c, FIG. 5d, problems start when a pointer cell with a data frame delimiter pointer value PTR is lost. In FIG. 5c the actual second type cell N+4th is missing and therefore there is no information any longer as to how many data units in the current frame and/or the next frame must be replaced with dummy data units and in particular at which storage positions the insertion of dummy data units shall start. As shown in FIG. 5c, actually if the pointer value PTR=60 was known (somehow) and the data units were lost, then it would be possible to assign NDU2−PTR=60−46=14 data units to the sequential storage positions following those at which the last octet #2297 of the previous first type cell was stored. Since the next cell N+5 arrives intact, there is of course no reason to insert another 47 dummy data units because they are already known from the next cell.

However, without having any information of the pointer value PTR, it is not possible to insert dummy data units AIS at the appropriate positions. That is, the problem with loosing a second type cell is not the loosing of the data units, but that there is a far more severe problem in that the delimitation of the two frames with respect to their data units also gets lost. That is, since the pointer is lost, all information about the next data frame is lost unless there is the possibility to retrieve a pointer value somehow. However, since the state machine only indicates that the second type cell is missing, there is no further information available in the prior art, which allows to delimit the two data frames.

This case also occurs generally, as shown in FIG. 5d, where a pointer value PTR<46 is always indicating an overlapping of the data units of the second type cell in the previous and in the next frame. Also in this case, it is completely impossible to detect at which position the sequential storage of data units should continue once the next cell N+5 is received intact. That is, since the pointer value is lost, it cannot be derived where the starting of the right operation in the next frame DF' starts.

Therefore, in case a pointer or dummy pointer cell has been lost, the stream of assembled STM-1/AU-4 frames will become too long and there is no possibility to resynchronise the procedure unless a next second type cell is received intact. Thus, it can happen, that at least one complete frame gets lost and all positions need to be written with dummy data units until the next second type cell arrives.

That the loss of a second type cell is indeed a severe problem in such circuits switched ATM emulations is also apparent from the prior art. For example, JP 090 557 46 A describes a phase jump prevention system for a DBR signal and in this system the phase jump is prevented by switching only a pointer value to a last frame value when a discarded cell includes a pointer. That is, here, the last pointer is stored in a front point holder and if the pointer of a CBR signal is pertaining to a lost cell, the pointer relating to dummy data in the front pointer holder is selected by a switch. That is, here it seems to be the case that a last held pointer is maintained and if problems with cell loss occurs, the last pointer is used. However, this is not a quite accurate method, because, as seen in FIG. 4c and FIG. 4d, the pointers may successively assume different values such that it can not be guaranteed that the last stored pointer is correct also for the next delimitation of two frames.

SUMMARY OF THE INVENTION

As explained above with reference to FIGS. 5c, 5d, in the conventional frame reassembly procedure, a complete frame gets lost if a second type cell including a pointer value field PVF including a data frame delimiter pointer value PTR is lost. There is no other remedy but to wait one complete frame until the next second type cell with a relevant data frame delimiter pointer value occurs which is then used for restarting the procedure.

However, it would be desirable to not lose the complete frame data only because a single second type cell gets lost.

Therefore, the object of the present invention is to provide a method and a device for reassembling data frames on a receiving side which can avoid that the complete data or a complete frame gets lost only because a second type cell including a data frame delimiter pointer value PTR is lost during the transmission.

This object is solved (claim 1) by a method for assigning data units contained in successive cells of a cell stream to sequential storage positions of successive data frames of a data frame stream, wherein each of said data frames contains a predetermined number NF of data units, and said cell stream is organized as sequential cell blocks each with a predetermined number NC1 of first type cells including at least a sequence number field indicating the position of the cell in the cell block and a first data portion with a first number NDU1 of data units; and one second type cell including at least a sequence number field indicating the position of the cell in the cell block; a second data portion with a second number NDU2 of data units; and a pointer value field including at least a data frame delimiter pointer value indicating a number PTR of sequential data units of at least the second data portion to be written to a previous data frame before data units follow to be written to a current data frame; comprising the following steps of receiving a second type cell, reading the sequence number and the data frame delimiter pointer value of this second type cell; reading from the second data portion the last NDU2−PTR data units and assigning them to the first NDU2−PTR sequential storage positions of the current frame; receiving further cells, reading the data units from the respective data portion of the cells, and assigning the read data units to sequential storage positions of the current frame following those at which the data units of the second data portion are stored; receiving a cell loss indication indicating that in a current cell block a second type cell having a data frame delimiter pointer value is missing; determining and memorizing the sequence number of the missing second type cell and determining and memorizing the number PTR' of data units in the missing second type cell which still belong to the current frame on the basis of the read data frame delimiter pointer value, the sequence number of the read second type cell and the number of data units per frame; and assigning a number PTR' of dummy data units to the final sequential storage positions of the current frame; assigning a number NDU2–PTR' of dummy data units to the first sequential storage positions of the next frame; and reading NDU1 data units from the first type cell having the sequence number following the determined sequence number of the missing second type cell and assigning the data units to the sequential storage positions in the next frame following those of the dummy data units.

Furthermore, this object is solved by a frame assembly device (claim 6) for assigning data units contained in successive cells of a cell stream to sequential storage positions of successive data frames of a data frame stream, wherein each of said data frames contains a predetermined number NF of data units, and said cell stream is organized as sequential cell blocks each with a predetermined number NC1 of first type cells including at least a sequence number field indicating the position of the cell in the cell block; and first data portion with a first number NDU1 of data units; and one second type cell including at least a sequence number field indicating the position of the cell in the cell block; a second data portion with a second number NDU2 of data units; and a pointer value field including at least a data frame delimiter pointer value indicating a number PTR of sequential data units of at least the second data portion to be written to a previous data frame before data units follow to be written to a current data frame; comprising: a reception unit adapted to receive a second type cell, and a read unit adapted to read the sequence number and the data frame delimiter pointer value of this second type cell; said read unit being further adapted to read from the second data portion the last NDU2–PTR data units and an assignment unit assigning them to the first NDU2–PTR sequential storage positions of the current frame; said reception unit being further adapted to receive further cells, said read unit being further adapted to read the data units from the respective data portion of the cells, and said assignment unit being further adapted to assign the read data units to sequential storage positions of the current frame following those at which the data units of the second data portion are stored; a cell failure determination unit adapted to detect that in a current cell block a second type cell having a data frame delimiter pointer value is missing and adapted to issue a cell loss indication about this second type cell loss; a determining and memorizing unit adapted to determine and memorize the sequence number of the missing second type cell and to determine and memorize the number PTR' of data units in the missing second type cell which still belong to the current frame on the basis of the read data frame delimiter pointer value, the sequence number of the read second type cell and the number of data units per frame; and when the cell loss indication is received from the cell failure determination unit, said assignment unit being adapted to assign a number PTR' of dummy data units to the final sequential storage positions of the current frame; to assign a number NDU2–PTR' of dummy data units to the first sequential storage positions of the next frame; and said read unit being adapted to read NDU1 data units from the first type cell having the sequence number following the determined sequence number of the missing second type cell and said assignment unit being further adapted to assign the data units to the sequential storage positions in the next frame following those of the dummy data units. According to a first aspect of the invention, it has been realized that there is a possibility to regenerate the pointer value if an indication is received in or before a cell block that the second type cell including a relevant pointer value is missing. This recognition is based on the fact that the length of the data frame, i.e. the predetermined number NF of data units per frame, remains constant. Therefore, if the procedure has once been successfully started by receiving a second type cell, from the point of receiving this second type cell intact, it can be calculated on the basis of this pointer value and the number of data units per frame what value the pointer in a next second type cell should have. That is, whilst the sequence number of the missing second type cell is e.g. indicated by a cell loss indication signal (or can be calculated) the number of data units in this second type cell which should still belong to the current frame can be determined. Thus, pre-calculating or estimating the pointer of the next second type cell in the relevant cell block allows to fully determine how many data units are possibly missing when the second type cell gets lost and need to be preset with dummy data units and at which position the writing of data units in the next frame should continue.

ADVANTAGEOUS EMBODIMENTS

Preferably (claim 2), said second type cell further includes in said pointer value field a dummy pointer value indicating that neither a start nor an end of frame occurs in the data block in which the second type cell is included; or a frame&block end pointer value indicating that the end of the frame coincides with the end of the data block; said method further comprising the following steps of providing NC1+1 counters $C_1, C_2, \ldots, C_{SN+N}, C_{NC1+1}$, one for each sequence number SN; setting said NC1+1 counters $C_{SN+N}$ respectively assigned to the (SN+N)-th sequence number, wherein N=1, 2, ..., NC1+1 and if (SN+N)>NC1 then N=N−(NC1+1), respectively to counter values $CV_{SN+1}=(NF-NDU2+PTR)$, $CV_{SN+2}=CV_{SN+1}-NDU1, \ldots, CV_{SN+N}=CV_M-NDU1$, wherein M=SN+N−1 if SN+N−1≧0 and M=(SN+N−1)+(NC1+1) if SN+N−1<0 and if CV<0 then CV=NF−CV, and assigning NDU2–PTR data units of the second data portion of the second type cell to sequential NDU2–PTR storage positions at the beginning of the current frame; receiving a next cell, reading the sequence number SN of the next cell, reading NDUx data units from the data portion of the next cell, wherein x=1 if the sequence number SN corresponds to a first type cell and x=2 if the sequence number SN corresponds to a second type cell having a dummy-pointer value or a block&frame end pointer value, reading the counter value $CV_{SN}$ of the counter corresponding to the SN-th sequence number SN; setting NC1+1 counters $C_{SN+N}$ respectively assigned to the (SN+N)-th sequence number, wherein N=1, 2, ..., NC1+1 and if (SN+N)>NC1 then N=N−(NC1+1), respectively to counter values $CV_{SN+1}=(CV_{SN-N}DUx), CV_{SN+2}=CV_{SN+1}-NDUx, \ldots, CV_{SN+N}=CV_M-NDUx$, wherein M=SN+N−1 if SN+N−1≧0 and M=(SN+N−1)+(NC1+1) if SN+N−1<0 and if CV<0 then CV=NF−CV, and assigning the read NDUx data units to sequential storage positions of the current frame; repeating the above receiving and setting steps until in the above receiving step an indication is received that in a current cell block a second type cell having a data frame delimiter pointer value PTR is missing, if the indication is received that the second type cell is missing, reading the counter value $CV_{SN}$ of the counter $CV_{SN}$ corresponding to the sequence number SN of the second type cell, assigning $CV_{SN}$ dummy data units to the $CV_{SN}$ sequential storage positions at the end of the current frame, and assigning at least NDU2–$CV_{SN}$ dummy data units to the NDU2–$CV_{SN}$ sequential storage positions at the beginning of the next frame.

Further preferably (claim 7), said second type cell further includes in said a pointer value field a dummy pointer value indicating that neither a start nor an end of frame occurs in the data block in which the second type cell is included; or a frame&block end pointer value indicating that the end of the frame coincides with the end of the data block; said device further comprising NC1+1 counters $C_1$, $C_2$, ..., $C_{SN+N}$, $C_{NC1+1}$, one for each sequence number SN; a counter setting unit adapted to set said NC1+1 counters $C_{SN+N}$ respectively assigned to the (SN+N)-th sequence number, wherein N=1, 2, ..., NC1+1 and if (SN+N)>NC1 then N=N−(NC1+1), respectively to counter values $CV_{SN+1}$=(NF−NDU2+PTR), $CV_{SN+2}$=$CV_{SN+1}$−NDU1, ..., $CV_{SN+N}$=$CV_M$−NDU1, wherein M=SN+N−1 if SN+N−1≧0 and M=(SN+N−1)+(NC1+1) if SN+N−1<0 and if CV<0 then CV=NF−CV, and said assignment unit (WR) assigning NDU2−PTR data units of the second data portion of the second type cell to sequential NDU2−PTR storage positions at the beginning of the current frame; said reception unit receiving a next cell, said read unit reading the sequence number SN of the next cell, reading NDUx data units from the data portion of the next cell, wherein x=1 if the sequence number SN corresponds to a first type cell and x=2 if the sequence number SN corresponds to a second type cell having a dummy pointer value or a block&frame end pointer value, and said setting unit reading the counter value $CV_{SN}$ of the counter corresponding to the SN-th sequence number SN; said setting unit setting said NC1+1 counters $C_{SN+N}$ respectively assigned to the (SN+N)-th sequence number, wherein N=1, 2, ..., NC1+1 and if (SN+N)>NC1 then N=N−(NC1+1), respectively to counter values $CV_{SN+1}$=($CV_{SN}$−NDUx), $CV_{SN+2}$=$CV_{SN+1}$−NDUx, ..., $CV_{SN+N}$=$CV_M$−NDUx, wherein M=SN+N−1 if SN+N−1≧0 and M=(SN+N−1)+(NC1+1) if SN+N−1<0 and if CV<0 then CV=NF−CV, and said assigning unit assigning the read NDUx data units to sequential storage positions of the current frame; said read unit and said assignment unit repeating said reading and assigning in the above reception and setting features until said cell failure unit issues an indication that in a current cell block a second type cell having a data frame delimiter pointer value PTR is missing, wherein if the indication is received that the second type cell is missing, said setting unit reads the counter value $CV_{SN}$ of the counter $CV_{SN}$ corresponding to sequence number SN of the second type cell, said assignment unit assigning $CV_{SN}$ dummy data units to the $CV_{SN}$ sequential storage positions at the end of the current frame, and assigning at least NDU2−$CV_{SN}$ dummy data units to the NDU2−$CV_{SN}$ sequential storage positions at the beginning of the next frame.

According to a second aspect, as explained above, a number of counters is used and each counter is assigned to a particular sequence number of the cell block. A prediction into the future is always done for a number of cells ahead, i.e. whenever a cell is arriving at a particular sequence number position, the succeeding counters will be updated in accordance with the number of data unit which should be present in the cells in the next sequence numbers. Thus, a wrapping around procedure is performed with respect to the sequence numbers.

Furthermore, in the second aspect of the invention, whenever the count number of the data value falls below 0, a wrapping around is performed with respect to the data units. Thus, by looking ahead for the next NC1+1 cells, a value can be kept in a counter corresponding to the sequence number in which a second type cell will occur. If the cell does not arrive, an updating of this counter will not take place and therefore the preset counter value indicates the pointer value when the second type cell is missing. Therefore, this round-wrapping procedure with respect to the presetting of counter value in advance allows to always keep or generate the relevant pointer value field which is necessary for determining how many data units should be set with dummy data units.

Further advantageous embodiments and improvements of the invention may be taken from the dependant claims. Furthermore, the present invention is not restricted to the embodiments and examples described in the specification and further advantageous embodiments can be derived from a combination of individual features separately listed in the claims and the description.

Furthermore, various modifications and variations of the invention may be carried out on the basis of the teachings herein and therefore, what is described below should only be considered as what the inventors presently conceive as the best mode of the invention. However, the invention should by no means be seen as restricted to this description.

BRIEF DESCRIPTION OF THE DRAWINGS

In the drawings, the same or similar reference numerals denote the same or similar parts and steps throughout.

FIG. 4c shows an example of a cell block CB where the pointer value is contained in an even sequence number SN=2;

FIG. 4d shows an example of a cell block CB where the pointer value is contained in an even sequence number the position SN=4 but the actual frame delimitation occurs in an odd sequence number position SN=5;

FIG. 4e shows an example of a cell block CB where the delimitation from frame to frame occurs at the end of the last cell of the cell block;

FIG. 4f shows the next cell block after the cell block in FIG. 4e;

FIG. 8a shows a sequence of the first two cell blocks CB1, CB2 after receiving and starting the assignment procedure with a first cell containing a pointer value PTR=0, also showing the setting of the counter values when successively cells arrive;

FIG. 8b the setting of counters during the arrival of further cells arriving several cell blocks (n blocks) after the cell blocks shown in FIG. 8a;

FIG. 8c shows the transition from one frame to another frame if the delimitation occurs in a cell with an odd sequence number (SN=5);

FIG. 8d shows the setting of counters and the delimitation when the end of the frame coincides with the last cell in a cell block CB; and FIG. 8e shows an example of the updating of counters when a second type cell is missing.

Hereinafter, the invention will be explained with reference to its advantageous embodiments. Although hereinafter the cell block construction, the number of data units per cell, the insertion of the pointer value within the payload data portion as well as the number of cells per block is explained and referred to with reference to the standard AAL type 1 system as disclosed in the aforementioned ITU-U document I.363.1, it should be understood that other values than the ones mentioned below may be used and that the invention is not restricted to the particular example of AAL type 1.

Furthermore, hereinafter cases will be illustrated where the data portion of first type cells is one data unit (one octet) longer than the second data portion of a second type cell due to the insertion of the pointer value (one octet) within the data portion. However, other embodiments of the invention are conceivable, in which the pointer value is for example inserted in the cell header such that the first data portion and the second data portion of a first and second type cell, respectively, would contain the same number of data units. The difference between the number of data units in a first and second type cell may also be larger than 1.

Therefore, the description below should by no means be seen as restrictive to the specific number and sizes of parameters and various modifications and variations of the invention may be possible for the skilled person in the art. In particular, the second type cell STC does not need to have an even sequence number SN. A Principle of the Invention Firstly, hereinafter it should be noted that the point in time where the state machine issues an indication that the second type cell is missing can be received at any stage during the assignment procedure. For example, it can be received shortly before the actual second type cell would occur, however, it is also possible that the missing second type cell indication is received at the beginning of the cell block CB. Therefore, in the flow chart of the invention in FIG. 7b it should be noted that step S16 may be present at other positions in the sequence of steps, i.e. whenever an indication of a missing cell is received.

Figure 7A:
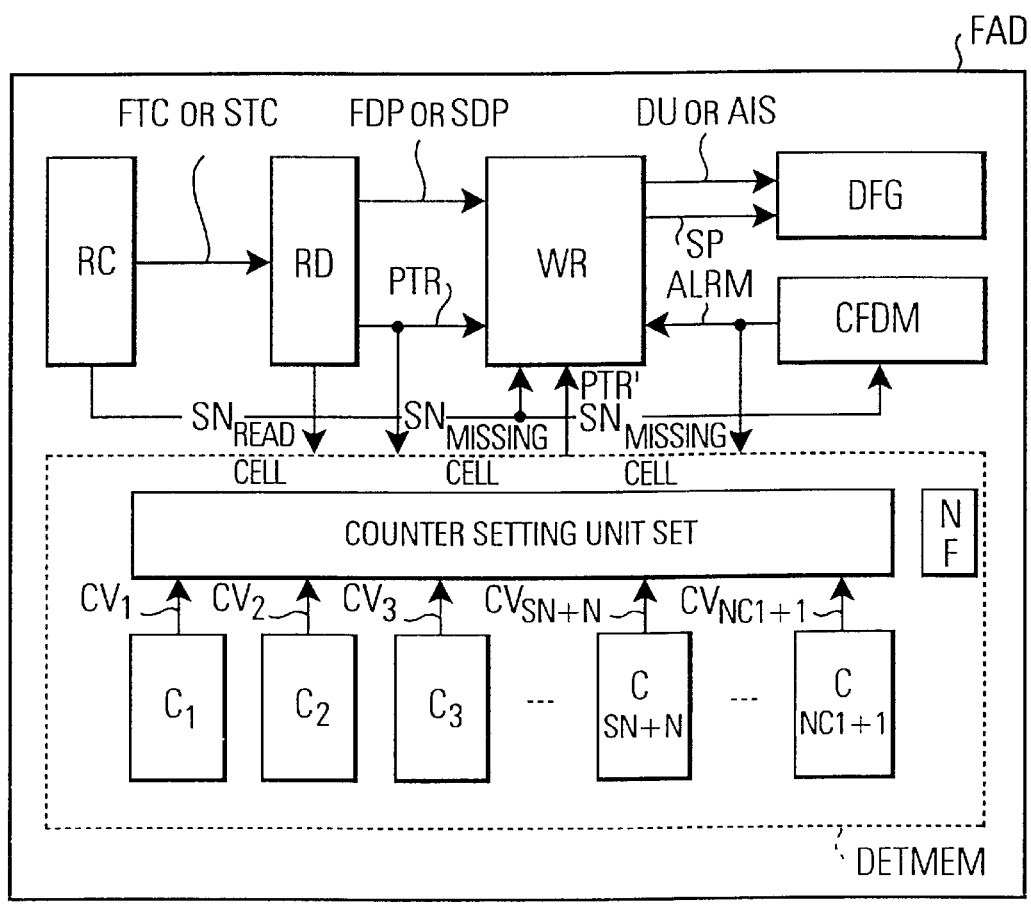
FIG. 7a shows a frame assembly device FAD in accordance with the invention.
Figure 7B:
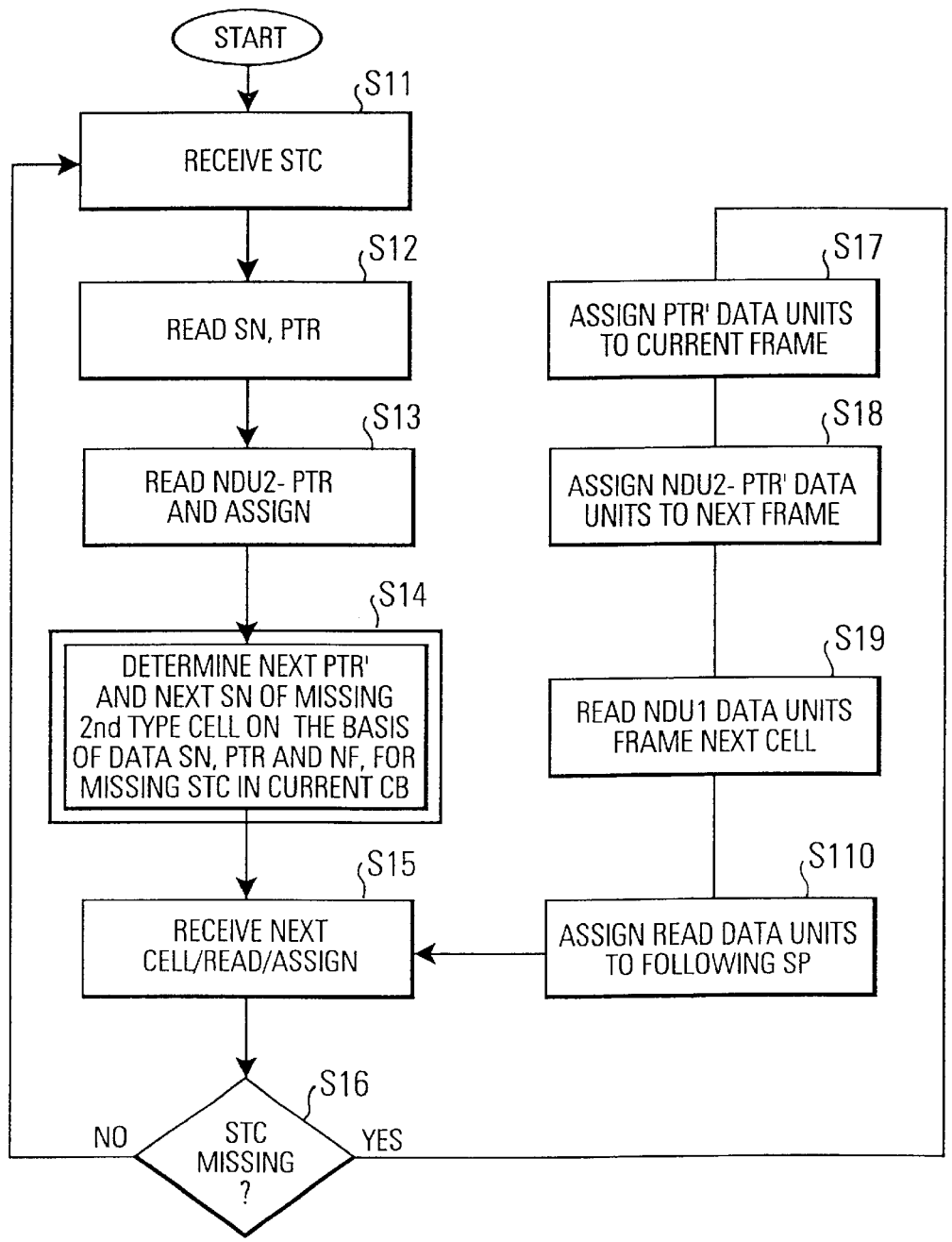
FIG. 7b shows an assignment procedure of data units to data frames in accordance with the principle of the invention.

Firstly, for understanding the principle of the invention, FIG. 7a shows a frame assembly device FAD in accordance with the invention. FIG. 7b shows a flow chart of the method of the invention.

Figure 1:
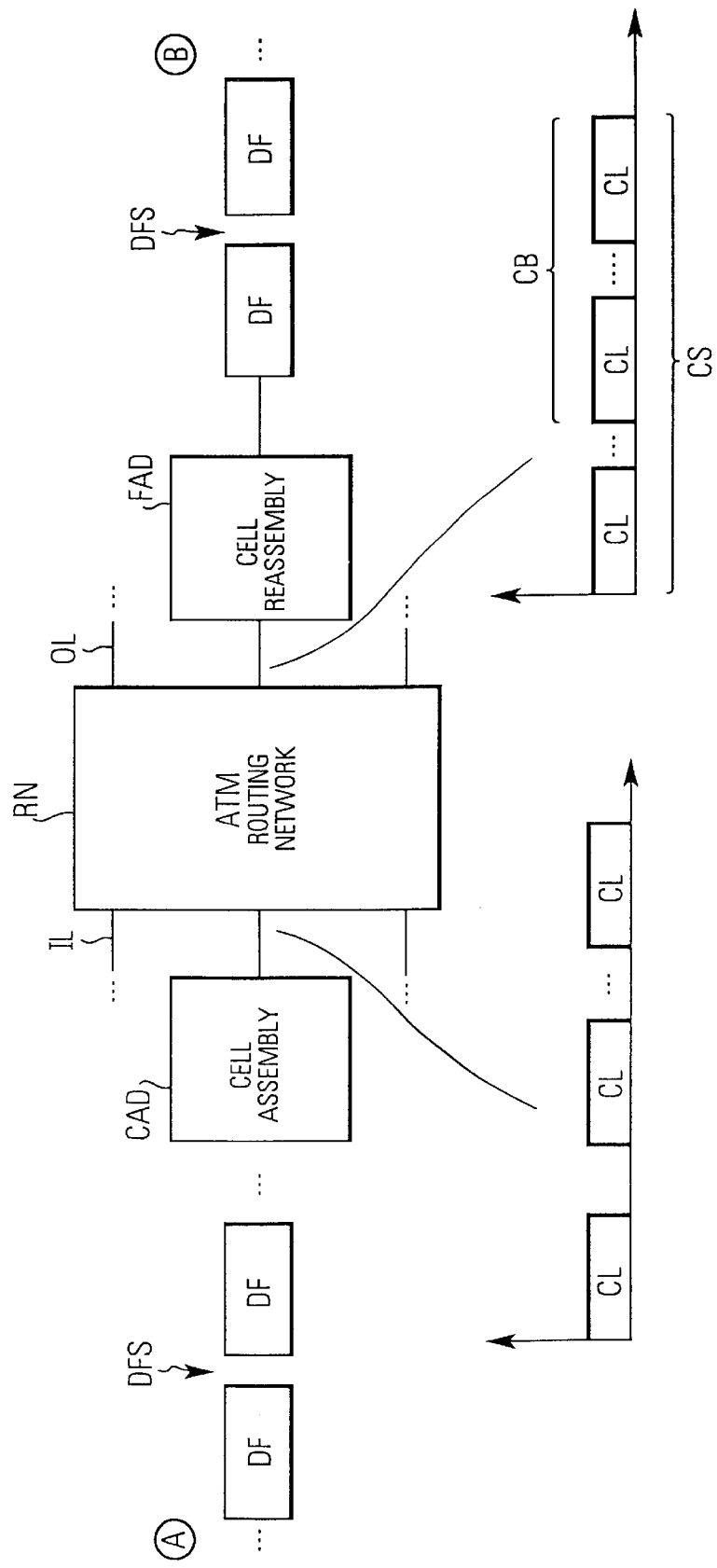
FIG. 1 is an overview of a communication system SYS where circuit-switched frames DF are decomposed in cells CL to be routed to an ATM routing network RN.
Figure 2A:
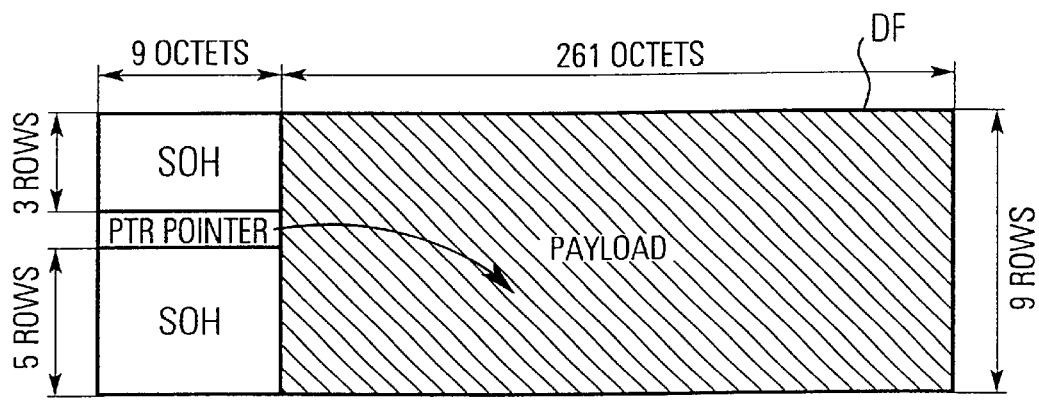
FIG. 2a shows a typical format of the data frame DF shown in FIG. 1.
Figure 2B:
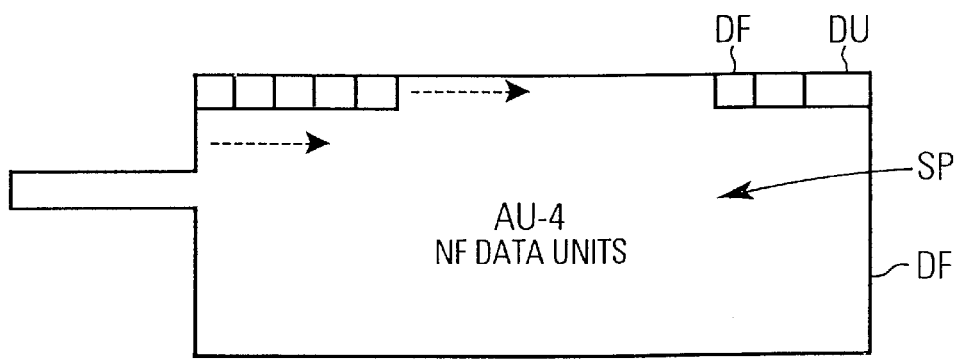
FIG. 2b shows the relevant portion of the data frame DF to be segmented into sequential cells containing data units DU.
Figure 3A:
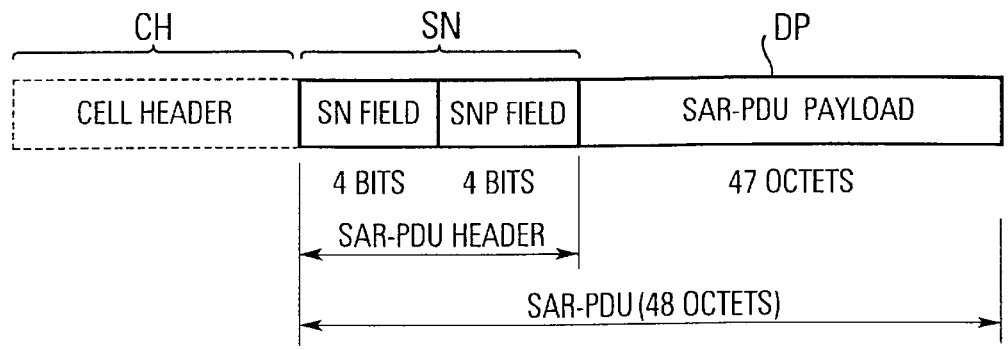
FIG. 3a shows the general format of a cell CL shown in FIG. 3.
Figure 3B:
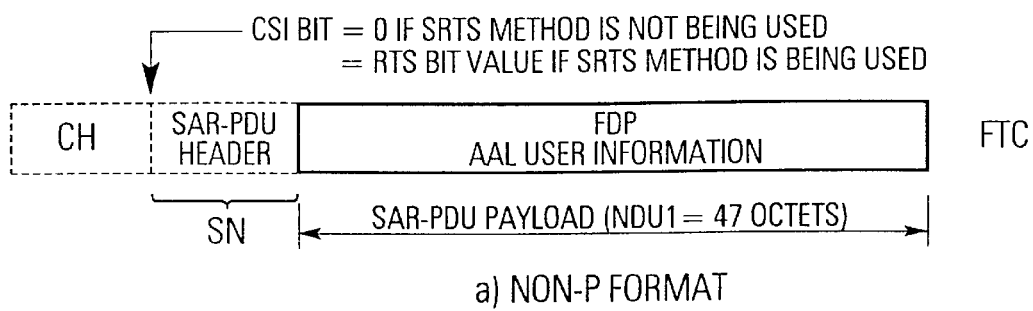
FIG. 3b shows a typical cell format of a first type cell FTC.
Figure 3C:
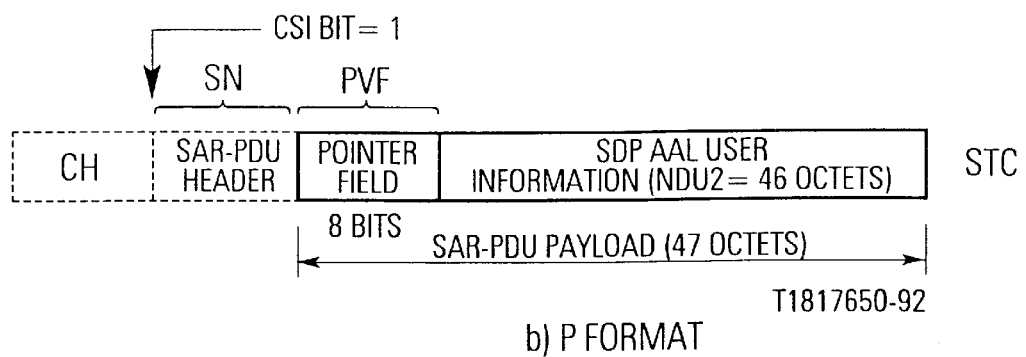
FIG. 3c shows a typical format of a second type cell STC.
Figure 4A:
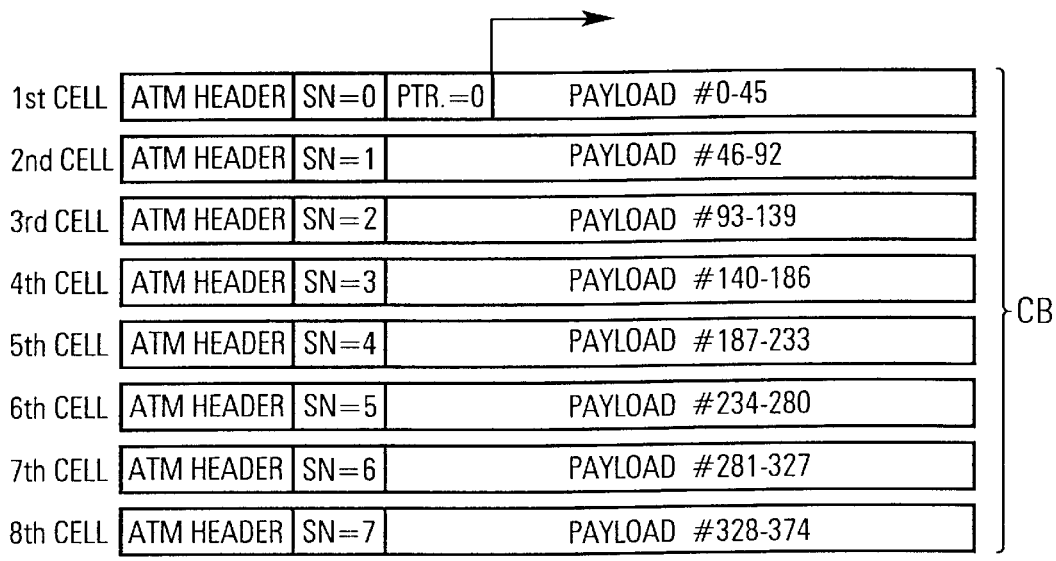
FIG. 4a shows a first cell block CB where the second type cell is contained in sequence number SN=0.

Firstly, it should, however, be understood that the arrangement of cells and the assignment of data units of cells is generally performed as described above with reference to FIG. 1 and with respect to FIGS. 2, 3, 4. That is, the data units DU contained in successive cells CL of a cell stream CS (see FIG. 1) are to be assigned to sequential storage positions SP of successive data frames DF of a data frame stream DFS, wherein each of said data frames DF contains a predetermined number NF of data units DU and said cell stream CS is organized as sequential cell blocks CB, each with a predetermined number NC1 of first type cells FTC (see FIG. 2b) and a single second type cell STC (see FIG. 2c).

In particular, the first type cells FTC include at least a sequence number field SN indicating the position of the cell CL in the cell block CB and a first data portion FDP with a first number NDU1 of data units DU. Typically, the predetermined number NF of data units DU is NF=2358 for the above-described system, and the first number NDU1 of data units is NDU1=47.

The second type cell STC includes at least a sequence number field SN indicating the position of the cell CL in the cell block CB, a second data portion SDP with a second number NDU2 of data units, and a pointer value field PVF including at least a data frame delimiter pointer value PTR indicating a number PTR of sequential data units DU of at least the second data portion SDP to be written to a previous data frame DF before data units DU follow which are to be written to a current data frame DF. A typical value for the second number NDU2 of data units is NDU2=46. The value of the pointer value field, more particularly the value of the data frame delimiter pointer value PTR, will depend on whether it is situated in a even sequence number or an odd sequence number and the predetermined number of data units DU. In the present example the pointer does not occur in an odd sequence number SN.

Figure 4B:
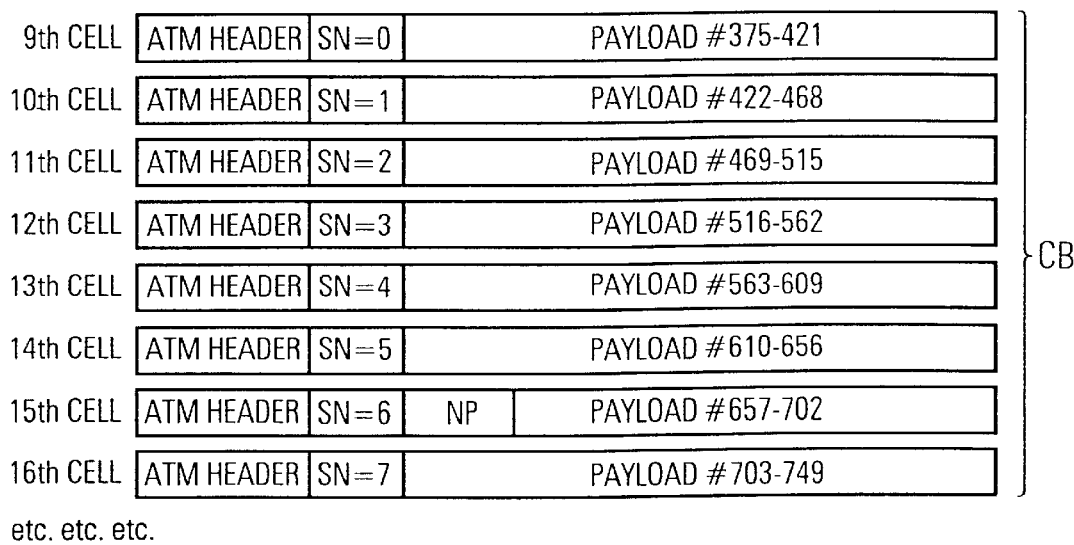
FIG. 4b shows an example of a cell block CB where a dummy pointer value NP is present at the last sequence number position SN=6.

Furthermore, of course the second type cell can also include in said pointer value field, depending on where it is positioned in the cell block, a dummy pointer value NP indicating that neither a start nor an end of a frame occurs in the data block in which the second type cell is included, or a frame & block end pointer value indicating that the end of the frame coincides with the end of the data block. Such examples of the pointer value are illustrated in FIG. 4b and FIG. 4e. However, the present situation relates to a case where the second type cell including a frame delimiter portion is lost.

Figure 6A:
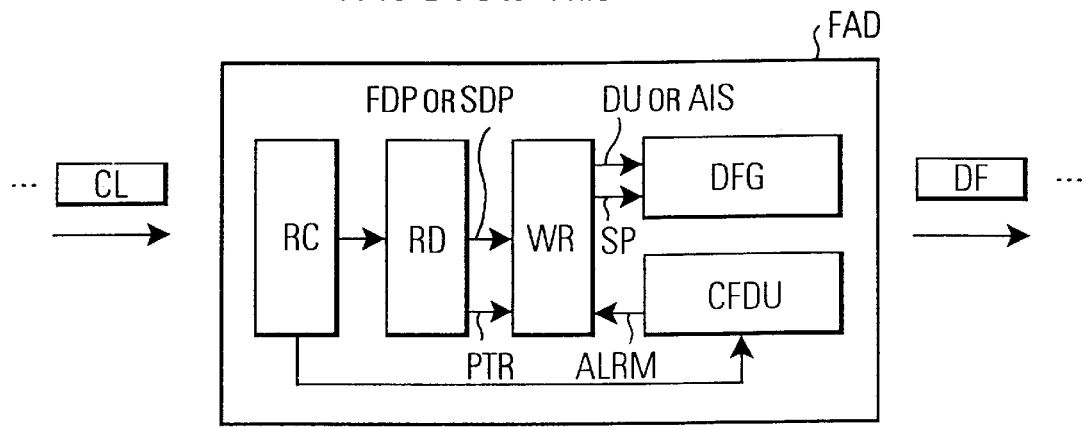
FIG. 6a shows a frame assembly device FAD in accordance with the prior art.

The principle of the invention can be understood by considering the determination and memorizing unit DETMEM shown in FIG. 7a in connection with FIGS. 8a, 8b, 8c. As shown in FIG. 7a, by contrast to the frame assembly device FAD of FIG. 6a, the inventive frame assembly device FAD essentially comprises a determining and memorizing unit DETMEM adapted to determine and memorize the sequence number SN (missing cell) of the missing second type cell STC and to determine and memorize the number PTR' of data units DU in the missing second type cell STC which still belong to the current frame DF on the basis of the read data frame delimiter pointer value PTR of the last valid second type cell output by the read unit RD, the sequence number SN (read cell) of the read second type cell STC output by the read unit RD and the number of data units per frame NF which is constant is set in the as a constant in the device DETMEM and/or elsewhere in the device FAD.

Here, the sequence number SN of the missing second cell STC can either be output directly by the cell failure determining unit CFDM (e.g. by a state machine according to the ITU-T I.363.1 standard) when it determines a failure i.e. that a second type cell with a frame delimiter value is lost, or it can be actively determined by the device DETMEM because if the number of data units NF per frame, the old sequence number SN of the last second type cell STC and the pointer value PTR of this last second type cell STC and the number of data units in a first and second type cell and the number of cells per data block is known, the device DETMEM can always calculate the sequence number SN, i.e. the position, of the missing second type cell STC in the cell block CB.

For example, when the cell failure determining unit CFDU detects that in a current cell block CB a particular cell is missing by outputting the alarm signal ALRM together with an indication about the sequence number SN of the lost second type cell, the determining and memorizing unit DETMEM calculates or estimates the pointer value PTR' which would otherwise be present in the second type cell if it had not gone lost.

That is, on the basis of the recognition that the number of data units NF per frame remains constant, despite a second type loss, once a valid second type cell with a pointer value PTR has been received once by the reception unit RC, the next pointer value PTR can be estimated for the missing next second type cell on the basis of the old sequence number SN, in which the last valid second type cell was present, the last valid pointer value PTR pf a valid second type cell and the number of data units per frame NF.

Therefore, the method in accordance with the invention can be carried out as follows, with reference to FIG. 7b. In a step ST11 the receiving unit RC once receives a second type cell and reads the sequence number SN and the data frame delimiter pointer value PTR of this second type cell STC in step S12.

Figure 6B:
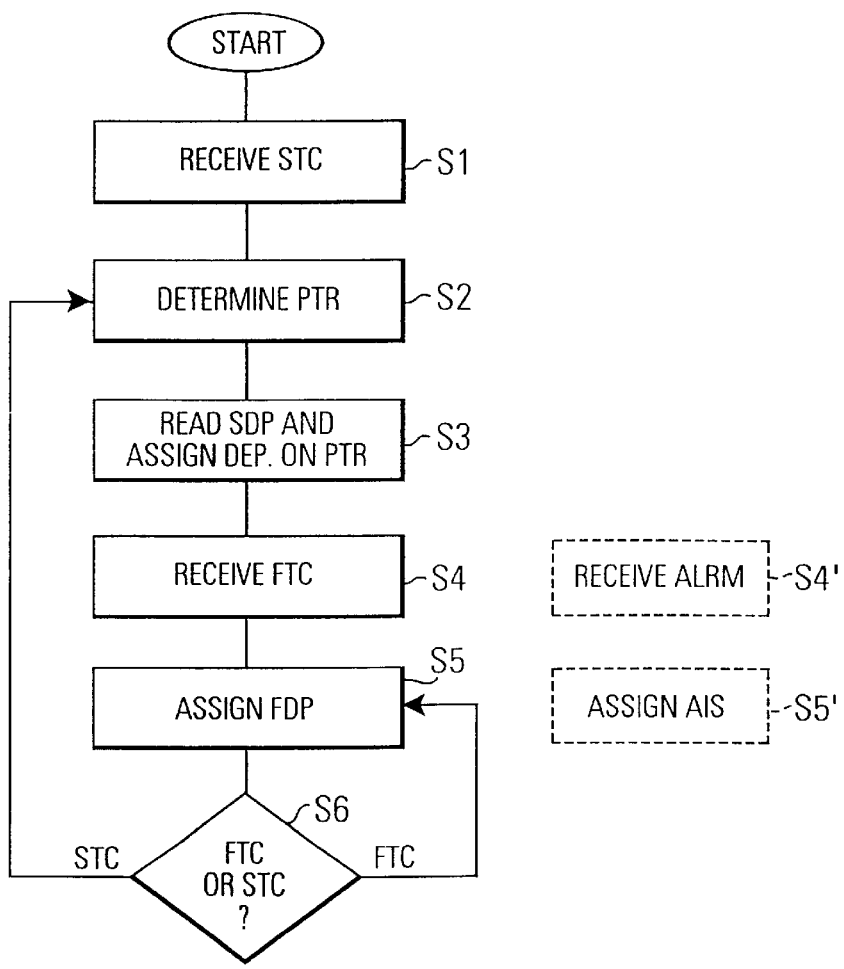
FIG. 6b shows a data unit assignment procedure in accordance with the prior art.

In step ST13, since a valid pointer PTR has been detected, the read unit RD reads from the second data portion DP the last NDU2-PTR data units and an assignment unit WR assigns the read NDU2-PTR data units to the first NDU2-PTR sequential storage positions SP of the current frame DF. For example, in FIG. 8a, if the $1^{st}$ cell contains the second type cell, a pointer contains the value PTR=0 and therefore, NDU2=46 data units (octets) are assigned to the current frame (zero data units are assigned to the previous data frame). As far as this procedure is concerned, for starting the inventive procedure in FIG. 7b, steps ST11, ST12, ST13 correspond to steps ST1, ST2, ST3 and FIG. 6b with the only exception that also the sequence number SN must be read.

In step S14 in FIG. 7b the determining and memorizing unit DETMEM determines and memorizes on the basis of the read data frame delimiter pointer value PTR, the number of data units per frame NF and the sequence number SN of the last valid second type cell STC, the sequence number SN of the next missing second type cell STC having a data frame delimiter pointer value PTR (either indicated by the alarm signal for the cell block CB or calculated by the device DETMEM), in which the second type cell should be present and the number PTR of data units DU in this second type cell STC, which still belong to the current frame DF.

Essentially, as e.g. shown in FIG. 8c, it is desired to calculate for the sequence number SN=4 (indicated as the sequence number of the missing second type cell, e.g. by a state machine, or calculated), a value PTR' corresponding to the number of data units, which belong to the next frame, i.e. the last sequential storage positions of the next cell N+5.

In step S15 the next first type cells are received and their data units are assigned to the sequential storage positions SP. If in step S16 an indication is received that in a cell block the second type cell is missing, then steps S17, S18, S19, S110 are carried out. S15 is repeated as long as first type cells FTC, dummy pointers or STC (93) arrive.

Firstly, in step S17 PTR' data units of the cell indicated by the determined sequence number SN are assigned to the current frame. In step S18, NDU2–PTR' data units are assigned to the next frame. In step S19, NDU1 data units are read from the next cell and in step S110 the read data units are assigned to the following sequential storage positions SP. In steps S17, S18 a number of dummy data units are assigned to the final sequential storage positions of the current frame and to the first sequential storage positions of the next frame dependent on the determined number PTR'.

An example should illustrate that the determining and memorizing unit DETMEM can in step S14 always determine on the basis of the old SN, the old PTR and the number of data units NF, for the sequence number position SN of the missing second type cell in the current cell block (either directly calculated or output by the device CFDM), the number PTR' relevant for determining the position and the number of dummy data units in the current data frame and the next data frame.

For the example it is assumed that NF=2358, the number of cells per cell block CB is SN=0, 1, 2 . . . 7 (i.e. in total eight cells per cell block CB) and that each first data portion contains 47 data units (octets) whilst each second data portion contains 46 data units (octets).

If a second type cell is received as a $1^{st}$ cell in FIG. 8a having a pointer value PTR, the determining and memorizing unit DETMEM in accordance with one embodiment of the invention can calculate the counter value PTR' and even the cell block in which the next second type cell is present in accordance with the following procedure (1)–(4):

The current cell is denoted STC. The current frame length is 2358 and RNF is the number of remaining data units of the frame/remaining from a total of NF data units.

(1) RNF=NF–(NDU2–PTR)

Current SN<7

(2) RNF=RNF–NDU1×(7–SN)

RNF now contains the NF–(data in current CB)

Current CB=0 (relative number)

(3) RNF=RNF–NCB×375

375=NDU2+7*NDU1 (data units in one CB)

NCB=highest number possible to keep RNF=0.

(4) RNF=RNF–N*2*NDU1

(2×NDU1=data units between 2 cells that can be STC)

N=highest number possible to keep RNF=0.

RNF in (4) should be the calculated PTR'.

2×N in (4) should be the SN where next STC shall be present.

NCB in (3) shall point out next CB where next STC shall be present. From this also the sequence number SN of the missing cell can be determined.

That is, knowing the length of the data frame NF and knowing the position where the P type cell (the second type cell) occurred previously in the cell block (i.e. the sequence number SN where it occurred), it is always possible to calculate the position of where the next second type cell should occur and, if it does not occur as indicated with the alarm signal, then the number PTR' of dummy data units are assigned to the final sequential storage positions of the current data frame and the NDU2−PTR' dummy data units are assigned to the first sequential storage positions of the next frame.

Therefore, the core principle of the present invention is to pre-estimate the pointer value and its position in order to determine at which sequential storage positions alarm indication (dummy) data units are to be inserted in the present and in the succeeding data frame. This is possible because the length of the data frame, i.e. the number of data units per frame, is always constant.

Hereinafter, especially advantageous embodiments are described how the pointer value and the position for dummy data units to be inserted can be determined using a number of counters or counter registers. This embodiment is explained with reference to FIG. 7a and with respect to the tables respectively shown below the cell blocks CB in FIG. 8a, FIG. 8b, FIG. 8c, FIG. 8d, FIG. 8e.

Embodiment of the Invention

As already mentioned above, in accordance with the invention the position and the number PTR' can be determined on the basis of the constant length of data units NF in each frame.

As shown in FIG. 7a, the determining and memorizing unit DETMEM comprises a counter setting unit SET and a plurality of counters $C1, C2, C3 \ldots C_{SN+N}, \ldots C_{NC1+1}$. The NC1+1 counters are respectively associated to each sequence number SN, as may be taken from the tables shown below the individual examples in FIGS. 8a–8e.

The counter setting unit SET is adapted to set said NC1+1 counters $C_{SN+N}$ respectively assigned to the (SN+N)-th sequence number, wherein N=1, 2, ..., NC1+1 and if (SN+N)>NC1 then N=N−(NC1+1), respectively to counter values $CV_{SN+1}$=(NF−NDU2+PTR), $CV_{SN+2}$=$CV_{SN+1}$−NDU1, ..., $CV_{SN+N}$=$CV_M$−NDU1, wherein M=SN+N−1 if SN+N−1≧0 and M=(SN+N−1)+(NC1+1) if SN+N−1<0 and if CV<0 then CV=NF−CV. The setting of counters in accordance with the aforementioned equations is shown in FIG. 8a for the first two cell blocks CB1, CB2. If it is for example assumed that the first valid second type cell occurs at the sequence number SN=0, the setting of counters in accordance with the above counter setting method will be as follows:

SN=1: $C_{SN+N}$=$C_{0+1}$=$CV_1$=(NF−NDU2+PTR)=2358−46+0= 2312;

SN=2: $C_{SN+}$N=$C0_{+2}$=$CV_2$=CV1−NDU1=2312−47=2265;
...

SN=0: N=7+1=8; (SN+N)>NC1 because (0+8)>7; N=8−(7+1)=0;
$CV_{SN+N}$=$CV_{0+0}$=$CV_M$−NDU1=$CV_7$−47, because M=N+N−1=M=0=8−1=7 and therefore $CV_0$=2030−47=1983.

Thus, after receiving the first cell in a cell block CB1 in FIG. 8a, the setting of counters is as shown with the first column in the table below the cell block CB2.

Next, the first type cell (the $2^{nd}$ cell) is received in the cell block CB1. Then, the following NC1+1 counters into the future will be set:

Firstly, when the next cell SN=1 is received, the receiving unit RC reads the sequence number SN of the second cell, reads NDU data units from the data portion of the next cell, wherein x=1 if the sequence number SN corresponds to a first type cell and x=2 if the sequence number SN corresponds to second type cell having a dummy pointer value NP or a block & frame end pointer value 93, wherein the counter value $CV_{SN}$ of the counter corresponding to the SN-th sequence number SN is read.

Then, the NC1+1 counters $C_{SN+N}$ respectively is assigned to the (SN+N)-th sequence number are set. Again, the NC1+1 different counters are set, namely N=1, 2, ..., NC1+1. If (SN+N)>NC1, then N=N−(NC1+1) and the counter values $CV_{SN+1}$=($CV_{SN}$_NDUx), $CV_{SN+2}$=$CN_{SN+1}$ NDUx ..., $CV_{SN+N}$=$CV_M$−NDUx, wherein M=SN+N−1, if SN+N−1>0 and M=(SN+N−1)+NC1+1) if SN+N−1<0 and if CV<0 then CV=NF−CV.

For the second cell with the sequence number SN=1 in the cell block CB1 this means that the 8 following counter values will be overwritten:

SN=2: $CV_{1+1}$=($CV_1$−NDUx)=(2312−47)=2265;
SN=3: $CV_{1+2}$=($CV_2$−NDUx)=2265−47=2218;
...
SN=1: $CV_0$−NDU2=1983−46=1936.

Of course, the read 47 data units from the second cell (SN=1) of the first cell block CB1 are assigned to sequential storage positions of the current frame. The aforementioned steps are carried on as shown in the table in FIG. 8a until an indication is received that in a current cellblock a second type cell having a data frame delimiter value PTR is missing.

FIG. 8b shows a scenario where the pointer value should be present in an even sequence number SN (FIG. 8b shows a cell block CBn arriving several cell blocks later than the ones shown in FIG. 8a). In this case, the last valid update is made for sequence number SN=1 when receiving the 50th cell. That is:
SN=2: 14
SN=3: 2326
SN=4: 2279
SN=5: 2232
SN=6: 2184
SN=7: 2138
SN=0: 2091
SN=1: 61

If now the indication is received that the second type cell is missing, at least the same time in the cell block CB before or during the 50th-cell, then no $51^{st}$-cell will occur in the cellblock CB in FIG. 8b. Therefore, the resetting procedure will only start once the next cell for SN=3 (i.e. the $52^{nd}$ is received). However, at a point in time where the missing second type cell is reported, the value of the counter SN=2 shows a number $CV_2$=14. As can be seen with the above procedure, once the cell of the second type is missing, there will be no update of the counter value $C_2$=14 and therefore the counter value for SN=2 indeed keeps the value of what was previously contained in the pointer. Thus, inherently on the basis of the length of the frame NF (because there has been a successive downcounting from the initial value of 2358), the correct pointer value PTR=14 is contained in counter SN=2. Furthermore, this counter value will only be updated when the $52^{nd}$ cell for SN=3 is received, because the updating is always for (NC+1) counters into the future. Therefore, at the point in time where a second type cell with a delimiter value is missing, the counter corresponding to the indicated sequence number SN=2 contains the pointer value which would otherwise be contained in the second type cell if it is present.

Therefore, when reading the counter value $CV_{SN}$ of the counter $CV_{SN}$ corresponding to the sequence number SN of the second type cell indicated to be missing, $CV_{SN}$ dummy data units AIS are assigned to the $CV_{SN}$ sequential storage positions at the end of the current frame and NDU2−$CV_{SN}$ dummy data units AIS are assigned to the NDU2−$CV_{SN}$ sequential storage positions at the beginning of the next frame.

This procedure is also valid, as indicated in FIG. 8c, if the pointer value should be contained in an even sequence number SN=4, whereas the actual delimitation of the frames occurs in a cell of an odd sequence number SN=5. In this situation the counter value $CV_4=60$ and the counter value $CV_5=14$. Therefore, when the second type cell for SN=4 is missing, then there will be no updating of this sequence number counter and therefore it can be determined that out of the 60 data units indicated with SN=4, NDU2 data units are assigned an AIS value. Furthermore, it can be determined that 14 data units of the next sequence number SN=5 still belong to the previous frame and the next NDU1-14 data units should be assigned to the first storage positions of the next frame.

Likewise, this procedure is of course valid if, as shown in FIG. 8d, a pointer value PTR=93 gets lost. Also in this case the sequence number SN=6 has associated a counter $C_6$ which holds the value of $CV_6=93$.

Likewise, in FIG. 8e a first type cell gets missing when the cell N+2 is lost. Therefore, the counter value for this sequence number SN=2 is not updated. This is only done with the correct value 2137 when the next cell arrives. Thus, no data is lost, since all counter values are based (in this example when cell N+3 arrives) on the value 107.

Therefore, with the updating of counter values NC1+1 times into the future beginning with the sequence number following that of the present cell, it can always be guaranteed that the counter corresponding to the sequence number of the cell which gets lost keeps the value which the pointer would have if it had not gone lose. This counter will only be updated when the next cell arrives. Therefore, on the basis of the data frame NF and the sequence number SN for which the last valid second type cell was detected, a counter value corresponding to the expected pointer value as well as its position within the cell block can be determined.

Summarizing the procedure as given with the equations above, in the tables shown in FIGS. 8a–d, the third column and the following describe the actual offset values that are calculated each time a new cell arrives. The second column contains the initial offset values, which the counters will have before the first cell of a shown sequence ($1^{st}$–$16^{th}$ cells) arrives (two cellblock CB1, CB2 are shown in FIG. 8a). That is, in this example it is assumed that the algorithm has been up and running for some time since last receiving a second type cell. This makes it possible to have already all values calculated (preset as mentioned above). In case the setting is done right after receiving the fist second type cell ($1^{st}$ cell in FIG. 8a), the second column is undefined until the firs cell (SN=0) arrives. If the cell for SN=0 including the pointer arrives, the subsequent eight (NC1+1) counters for SN=1, 2, 3 . . . SN=0 can be set.

In the example in FIG. 8a it is assumed that before the first cell arrives all of said values are undefined. As explained, when the first cell arrives (for SN=0) and it is a second type cell (P-type cell) with a pointer value 0 (and N=0) the following eight counters in a wrapped-around manner are set. Since the cell for SN=0 is already received, there is no reason to calculate the offset value for the counter which it should have BEFORE the cell arrives. That is, for previous cells and cell sequences there is no need to track old data. Now, before the next cell arrives (SN=1) the offset value for this cell is pre-calculated according to the above equation, namely:

$CV_{SN+1}=(NF-NDU2+PTR)=2358-46=2312$.

Then the counter value for the future SN=2 cell is calculated, namely:

$CV_{SN+2}=CV_{SN+1}-NDU1=CV_2=CV_1-47=2312-47=2265$

This procedure is carried on such that the following seven counters for in total eight future cells are set:
Future SN=3 cell: 2265-47=2218
Future SN=4 cell, 2218-47=2171
Future SN=5 cell: 2171-47=2124
Future SN=6 cell: 2124-47=2077
Future SN=7 cell: 2077-47=2030.

Thus, offset counter values for seven future cells have been calculated and in total eight future cells should be calculated, i.e. there must be a wrap-around to calculate the final next cell for SN=0 as well. For the calculation procedure SN=0 (that is, for the calculation the value of SN for the last arrived cell is taken) and therefore, if N=NC1+1 (i.e. the $8^{th}$ future cell)=8, then (SN+N)>NC1 since (0+8)>7. In this case N=N−(NC1+1), that is
N=8−(7+1)=0.

Therefore, the counter value $CV_{SN+N}=CV_{0+0}=CV_{M-NDU1}$.

Since SN+N−≧0 (0+8−1=7>0), M=SN+N−1=0+8−1=7.
Therefore, $CV_{0+0}=CV_7-47=2030-47=1983$.

Thus, after the first arriving of a cell eight future counters for arriving cells are set. This procedure is carried on for each newly arriving cell. The following example is carried out for the next cell SN=1.

All counter values are according to column #1 in the figure above. New cell SN=1 is received. The value 2312 of SN=1 is correct (otherwise this invention would not work). Calculating again results in:
Future cell SN=2, i.e. 2312-47=2265 (same as before)
Future cell SN=3, i.e. 2265-47=2218 (same as before)
Future cell SN=4, i.e. 2218-47=2171 (same as before)
Future cell SN=5, i.e. 2171-47=2124 (same as before)
Future cell SN=6, i.e. 2124-47=2077 (same as before)
Future cell SN=7, i.e. 2077-47=2030 (same as before)
SN=7 reach wrap around . . .
Future cell SN=0, i.e. 2030-47=1983 (same as before).
Seven values are calculated so far and the final $8^{th}$ is:
Future cell SN=1, i.e. 2983-47=1936 (new value).

That is, each counter keeps the value for one SN only. The SN=0 becomes 1608 the next time an SN=0 cell arrives.

Finally, at some stage an indication is reached that cell #51 is lost. However, cell #50 was received and all counters will have the following values:

| | |
|---|---|
| SN = 0: | 2091 |
| SN = 1: | 2044 |
| SN = 2 | 14 |
| SN = 3: | 2326 |
| SN = 4: | 2279 |
| SN = 5: | 2232 |
| SN = 6: | 2185 |
| SN = 7: | 2138 |

Now cell #52 and an indication is received that one cell has been lost. First of all information need to be given to the function actually assembling the frames again. The information is available that the lost cell had 14 octets of data still to send (offset value in counter for SN=2), i.e. 14 octets of AIS is inserted into the end of the frame. Since the sequence number is even and the offset value is low (>46) the lost cell is a P-type cell, i.e. 46 octets are lost. This in its turn gives the information that it is necessary to insert 46−14=32 octets of AIS into the new frame. For the received cell SN=3, there is no need to calculate anything for this SN since it has already received.
Future cell SN=4, i.e. 2326-47=2279 (same as before)
Future cell SN=5, i.e. 2279-47=2232 (same as before)

Future cell SN=6, i.e. 2232−47=2135 (same as before)
Future cell SN=7, i.e. 2285−47=2138 (same as before)
SN=7 reached, wrap around . . .
Future cell SN=0, i.e. 2138−47=2091 (same as before)
Future cell SN=1, i.e. 2091−47=2044 (same as before)
Future cell SN=2, i.e. 2044−47=1997 (was 14, not updated previously since this cell was lost)
Seven values are calculated so one more needs to calculated Future cell SN=3, i.e. 1997−47=1950 (new value).
As can be seen the offset value of the lost cell(s) is/are updated whenever a new cell arrives.

As explained above, according to the present invention, by pre-calculating the sequence number SN of the next second type cell having a data frame delimiter pointer value and the cell block in which the second type cell should be present as well as the number PTR' of data units in the second type cell, which still belong to the current frame, for example by means of the counters in the embodiment in FIG. 8, it can always be guaranteed that the pointer value is pre-calculated such that there is no necessity at all to actually read the pointer even if the cell with a pointer value arise. That is, once the procedure has been started by reading a correct pointer value, the complete assignment procedure may also be carried out without reading pointer values from further arriving second type cells. Of course, advantageously and in particular, the assignment procedure in accordance with the invention provides the pointer value PTR' (the counter value) which indicates how many of the data units in the second type cell (which gets lost) should still belong to the current data frame DF.

Figure 5A:
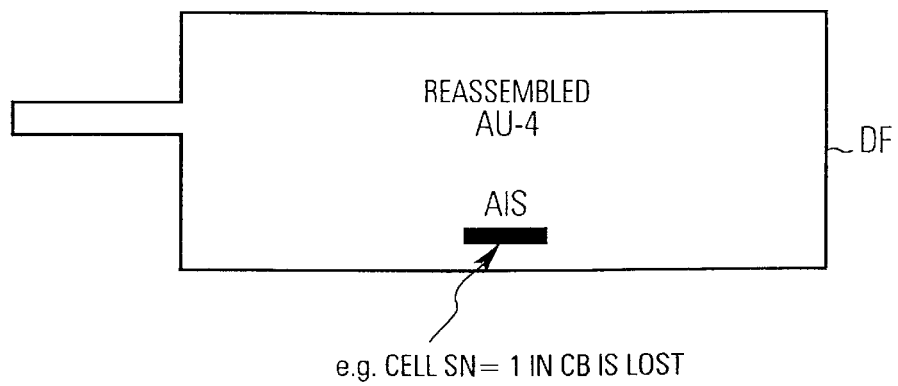
FIG. 5a shows a cell block CB and a reassembled frame DF for the case when a first type cell is lost during the transmission.
Figure 5B:
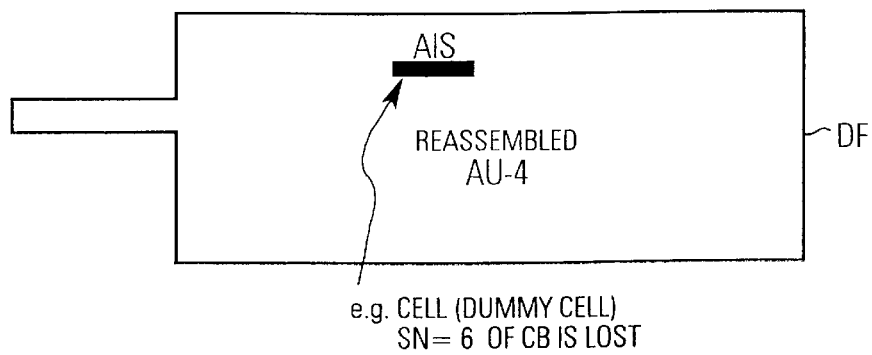
FIG. 5b shows the case where in a cell block CB a second type cell containing a dummy pointer value NP gets lost.
Figure 5C:
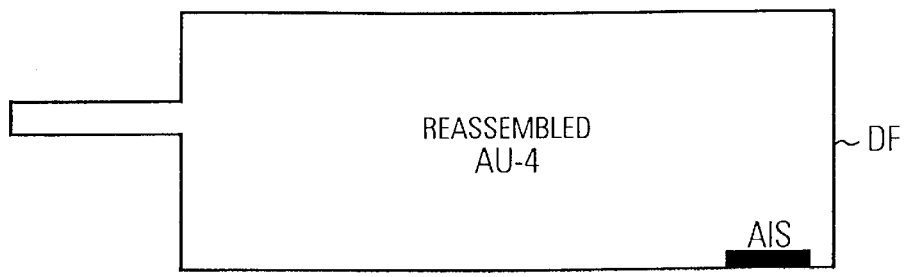
FIG. 5c shows an example of a cell block CB in case a second type cell with a relevant delimiter pointer value gets lost.
Figure 5D:
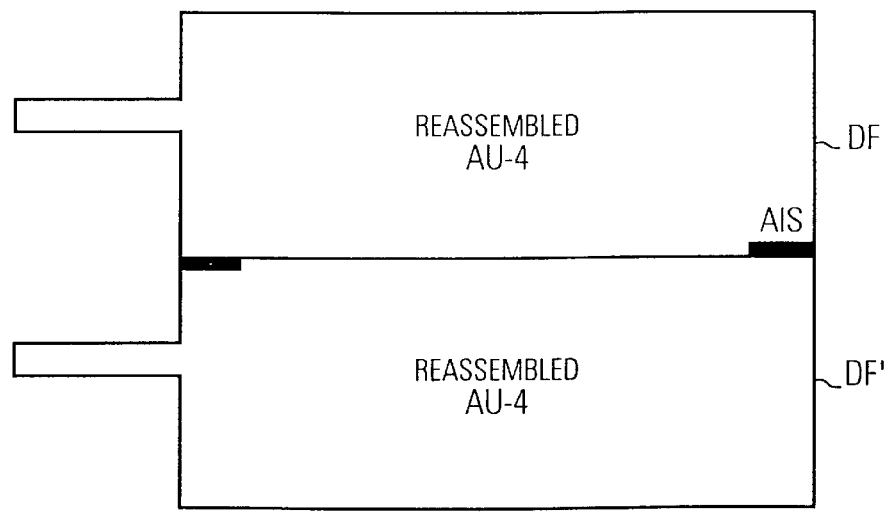
FIG. 5d shows a similar example as in FIG. 5c where the pointer value is PTR<46 such that the delimitation occurs at the end of the data frame DF and the beginning of the next data frame DF'.

For example, in FIG. 8b, if the second type cell with SN=2 (the 51th cell) gets lost, the counter value $CV_2$=14=PTR' holds the pointer value. If the previous cell (the $50^{th}$ cell) for SN=1 has arrived intact, the number PTR=14 can now be used to assign a number of PTR' of dummy data units AIS to the final sequential storage positions of the current data frame DF following those of the $50^{th}$ cell data units. That is, the frame DF would be filled with final AIS dummy data values as shown in FIG. 5d. Of course, since the $51^{th}$ cell got lost, not only the 14 data units belonging to the previous frame DF got lost but also NDU2−PDR' data units belonging to the next frame DF'. Therefore, a number of NDU2−PTR'=46−14=32 dummy data units must also be assigned to the first sequential storage positions of the next frame DF. This is shown with the first black AIS dummy data units in the next frame DF' in FIG. 5d.

If next the NDU1=47 data units DU are read from the next $52^{nd}$ cell with the SN=3 cell arriving intact, i.e. the cell with the sequence number SN=3 following the determined sequence number SN of the missing second type cell (SN=2), the data units read from the $52^{nd}$ cell are assigned to the sequential storage positions in the next frame DF' following those of the dummy data units AIS.

The aforementioned example corresponds to a situation where the pointer value PTR=14 would indeed be present in a second type cell having an even sequence number SN and the delimitation is also done in this cell (i.e. the pointer value PTR≦46 as shown in FIG. 5d). However, the procedure works equally well if a delimitation occurs in a cell having an odd sequence number, for example SN=5 in FIG. 5c and FIG. 8c. Since according to the conventions the second type cell can only occur in cells of even sequence number, here SN=4, the pointer value is >46, namely PTR=60. In this case, if the second type cell with SN=4 gets lost, a pointer value of 60 will be present in the counter for SN=4. Therefore, in principle the procedure would first assign PTR'=60 dummy data units AIS to the final sequential storage positions in the current data frame DF. However, assuming that the next first type cell for SN=5 arrives intact, of course this would be overdoing the insertion of AIS dummy data units because of the 60 dummy data units a total of NDU1=47 are arriving intact from the next cell with SN=5.

Therefore, in case the second type cell occurring at the even sequence number has a counter value or estimated pointer value PTR'≧47, advantageously at least the NDU1 data units from the first data portion of the next cell having a sequence number SN=5 following the sequence number SN=4 corresponding to the missing second type cell are read and of the NDU1=47 data units, 14 as indicated with the next counter for SN=5 will still belong to the final sequential storage positions of the current frame DF and 33 will belong to the sequential storage positions at the beginning of the next frame. Thus, 46 storage positions following those where the data units for SN=3 were stored in the previous frame, are assigned dummy data units, as shown in FIG. 5c. The remaining final sequential storage positions of the previous frame DF and the first 33 storage positions of the next frame can already be set with correctly received data units from the next cell SN=5.

By contrast, if the delimitation occurs in the cell with an even sequence number SN=2, as shown in FIG. 8b, then the NDU1=47 data units of the following cell SN=3 are assigned to the sequential NDU1=47 storage positions in the next frame following the storage positions of the assigned dummy data units, as shown in FIG. 5d.

Of course, the procedure in accordance with the invention also accounts for the case where a first type cell is missing. If an indication is received that a first type cell is missing, simply the NDU1=47 data units which are missing are replaced at the sequential storage positions by dummy data units AIS, as shown for the example in FIG. 5a.

However, the present invention can not only replace first type cells but can make a pre-estimation of the pointer when a second type cell is missing. It can do so independently of the fact as to whether or not the delimitation between two frames occurs in an even number cell or an odd numbered cell. The basic recognition of making the invention possible is that the distance between two second type cells in terms of data units is always constant and that thus the content of the second type cell, even if it is missing, should be fully predictable. It is thus possible to calculate in advance when a true or a dummy pointer will arrive and what offset (pointer value) it will get. If this is done, it is also possible to insert the right amount of AIS dummy data units in case a true or dummy pointer has been lost.

Thus, the above-described procedure of the invention can make the STM-1 circuit emulation in AAL1 more robust. In case of traffic disturbances in the ATM flow, the impact on the SDH flow will be limited. Automatic insertion of AU4-AIS dummy data units will be done instead of corrupted data if the lost data should contain the AU4 pointer and thus, if the AU-4 contains lower level TUG-structures, also these will have correct TU-AIS, which can be seen easily.

Although it has been described above that the separation of two cell blocks occurs either in the cell in which the pointer is present (see for example the $51^{st}$ cell in FIG. 4c) or in a cell which directly follows the pointer cell (see for example the N+$5^{th}$ cell in FIG. 4d) according to other embodiments of the invention the separation could take place an arbitrary number of cells after the pointer cell. Similarly as the N+4 th pointer cell in FIG. 4d, the missing pointer and therefore also the pointer value determined in accordance with the invention, e.g. by means of the counter setting procedure, would indicate a number of data units filling one or more subsequent cells and ending in a subsequent cell in which the cell block separation takes place.

INDUSTRIAL APPLICABILITY

As described above, the present invention is capable to pre-estimate the value of a pointer when reassembling data units from sequentially arriving cells into sequential storage positions of sequential data frames. An example with respect to STM-1 circuit emulation in AAL1 together with their specific values have been explained above. However, the inventive procedure can be used in other telecom applications where structured P-formatted AAL1 mapping is used for CBR (CBR: Constant Bit Rate).

As explained above, the inventive method and the device is also not limited to the fact that the second data portion of a second type cell has a one octet smaller data portion than a first type cell. It will depend in different implementations where a pointer value is inserted (in principle it could also be inserted in the header portion CH or the sequence number field SN (see FIG. 3a) in which case the first and second data portion would contain the same number of octets (NDU1=NDU2)). However, the same procedures of course apply to this case, where the same number of data units are contained in the first and second type cell.

Furthermore, as also explained above, in accordance with the invention it is actually only necessary to once "synchronize" the procedure by reading one valid second type cell. All future pointer values can then be pre-calculated also ahead for several frames. It should for example be noted that it would be sufficient to use only two counters, which allows loss of one single cell (FTC or STC). Using NC+1 counters allows safe reassembly of up to NC consecutive cells (FTC and/or STC). In the above embodiment 8 counters are used and can thus support loss of 7 consecutive cells (even though AAL2 specification can only detect loss of 6 consecutive cell). (This has actually nothing to do with CB. CB is just a convenient way to detect dummy pointers).

Actually only NC counters are enough, according to another embodiment the procedure works perfectly with only 6 counters.

Although it is not stated that the embodiment supports loss of up to 6 consecutive cells a skilled person can use this fact and make a simpler implementation which is a sub-part of this invention. Or vice versa, he could use this invention to be able to loose multiple cells.

Therefore, it should be noted that in principle the procedure also works if only a smaller number than the number of cells per cell block are predicted by the counter values. That is, it is possible to perform the pre-calculation of counter values only for a number of 1, 2, 3, 4 counter values.

However, of course the prediction is most stable if NC1+1 counter values are predicted into the future. Therefore, of course the indication that a second type cell is missing must be received at an appropriate time, i.e. the loss of cell indication must arrive before the next valid cell arrives. Otherwise, the counter value present for the missing cell would not correctly reflect the contents of the lost pointer.

Furthermore, it should be noted that various modifications and variations of the invention may be carried out on the basis of the above teachings. In particular, the invention comprises embodiments, which result from separate combinations of features, which have been independently described and claimed in the claims and the description.

Reference numerals in the claims only serve clarification purposes and do not limit the scope of these claims.

What is claimed is:

1. A method for assigning data units contained in successive cells of a cell stream to sequential storage positions of successive data frames of a data frame stream, wherein each of said data frames contains a predetermined number NF of data units, and said cell stream is organized as sequential cell blocks each with a predetermined number NC1 of
   first type cells including at least
      a sequence number field indicating the position of the cell in the cell block; and
      a first data portion with a first number NDU1 of data units; and
   one second type cell including at least
      a sequence number field indicating the position of the cell in the cell block;
      a second data portion with a second number NDU2 of data units; and
      a pointer value field including at least a data frame delimiter pointer value indicating a number PTR of sequential data units of at least the second data portion to be written to a previous data frame before data units follow to be written to a current data frame;

comprising the following steps:
   a) receiving a second type cell, reading the sequence number and the data frame delimiter pointer value of this second type cell;
   b) reading from the second data portion the last NDU2−PTR data units and assigning them to the first NDU2−PTR sequential storage positions of the current frame;
   c) receiving further cells, reading the data units from the respective data portion of the cells, and assigning the read data units to sequential storage positions of the current frame following those at which the data units of the second data portion are stored;
   d) receiving a cell loss indication indicating that in a current cell block a second type cell having a data frame delimiter pointer value is missing;
   e) determining and memorizing the sequence number of the missing second type cell and determining and memorizing the number PTR' of data units in the missing second type cell which still belong to the current frame on the basis of the read data frame delimiter pointer value, the sequence number of the read second type cell and the number of data units per frame; and
   f1) assigning a number PTR' of dummy data units to the final sequential storage positions of the current frame;
   f2) assigning a number NDU2−PTR' of dummy data units to the first sequential storage positions of the next frame; and
   f3) reading NDU1 data units from the first type cell having the sequence number following the determined sequence number of the missing second type cell and assigning the data units to the sequential storage positions in the next frame following those of the dummy data units.

2. A method according to claim 1,
   wherein
      said second type cell further includes in said pointer value field:
         a dummy pointer value indicating that neither a start nor an end of frame occurs in the data block in which the second type cell is included; or
         a frame&block end pointer value indicating that the end of the frame coincides with the end of the data block;

said method further comprising the following steps:
  a) providing NC1+1 counters $C_1, C_2, \ldots, C_{SN+N}, C_{NC1+1}$, one for each sequence number SN;
  b) setting said NC1+1 counters $C_{SN+N}$ respectively assigned to the (SN+N)-th sequence number, wherein N=1,2,...,NC1+1 and if (SN+N)>NC1 then N=N−(NC1+1), respectively to counter values $CV_{SN+1}$=(NF−NDU2+PTR), $CV_{SN+2}$=$CV_{SN+1}$−NDU1, ..., $CV_{SN+N}$=$CV_M$−NDU1, wherein M=SN+N−1 if SN+N−1≧0 and M=(SN+N−1)+(NC1+1) if SN+N−1<0 and if CV<0 then CV=NF−CV, and
  assigning NDU2−PTR data units of the second data portion of the second type cell to sequential NDU2−PTR storage positions at the beginning of the current frame;
  c) receiving a next cell, reading the sequence number SN of the next cell, reading NDU data units from the data portion of the next cell, wherein x=1 if the sequence number SN corresponds to a first type cell and x=2 if the sequence number SN corresponds to a second type cell having a dummy pointer value or a block&frame end pointer value, reading the counter value $CV_{SN}$ of the counter corresponding to the SN-th sequence number SN;
  d) setting NC1+1 counters $C_{SN+N}$ respectively assigned to the (SN+N)-th sequence number, wherein N=1, 2, ...,NC1+1 and if (SN+N)>NC1 then N=N−(NC1+1), respectively to counter values $CV_{SN+1}$=($CV_{SN}$−NDUx), $CV_{SN+2}$=$CV_{SN+1}$−NDUx, ..., $CV_{SN+N}$=$CV_M$−NDUx, wherein M=SN+N−1 if SN+N−1≧0 and M=(SN+N−1)+(NC1+1) if SN+N−1<0 and if CV<0 then CV=NF−CV, and
  assigning the read NDU data units to sequential storage positions of the current frame;
  e) repeating steps c) and d) until in step c) an indication is received that in a current cell block a second type cell having a data frame delimiter pointer value PTR is missing,
  f) if the indication is received that the second type cell is missing, reading the counter value $CV_{SN}$ of the counter $CV_{SN}$ corresponding to the sequence number SN of the second type cell, assigning $CV_{SN}$ dummy data units to the $CV_{SN}$ sequential storage positions at the end of the current frame, and assigning at least NDU2−$CV_{SN}$ dummy data units to the NDU2−$CV_{SN}$ sequential storage positions at the beginning of the next frame.

3. A method according to claim 1, wherein
  if the indication is received that the second type cell is missing, further reading at least the NDU1 data units from the first data portion of the next cell having a sequence number SN following the sequence number SN corresponding to the second type cell, and assigning the read NDU1 data units to the sequential NDU1 storage positions in the next frame following the storage positions with the dummy data units.

4. A method according to claim 1, wherein
  if a second type cell with a data frame delimiter pointer value PTR is received, reading at least the NDU2 data units from the second data portion of the received second type cell, and assigning PTR data units to the sequential storage positions of the end of the current frame and assigning the remaining data units to the sequential storage positions at the beginning of the next frame.

5. A method according to claim 4, wherein
  further reading at least the NDU1 data units from the first data portion of the next cell having a sequence number SN following that of the received second type cell, and assigning the read NDU1 data units to the sequential NDU1 storage positions in the next frame following the storage positions of the data units of the second data portion.

6. A frame assembly device for assigning data units contained in successive cells of a cell stream to sequential storage positions of successive data frames of a data frame stream, wherein each of said data frames contains a predetermined number NF of data units, and said cell stream is organized as sequential cell blocks each with a predetermined number NC1 of
  first type cells including at least
    a sequence number field indicating the position of the cell in the cell block; and
    a first data portion with a first number NDU1 of data units; and
  one second type cell including at least
    a sequence number field SN indicating the position of the cell in the cell block;
    a second data portion with a second number NDU2 of data units; and
    a pointer value field including at least a data frame delimiter pointer value indicating a number PTR of sequential data units of at least the second data portion to be written to a previous data frame before data units follow to be written to a current data frame;
comprising:
  a) a reception unit adapted to receive a second type cell, and a read unit adapted to read the sequence number and the data frame delimiter pointer value of this second type cell;
  b) said read unit being further adapted to read from the second data portion the last NDU2−PTR data units and an assignment unit assigning them to the first NDU2−PTR sequential storage positions of the current frame;
  c) said reception unit being further adapted to receive further cells, said read unit being further adapted to read the data units from the respective data portion of the cells, and said assignment unit being further adapted to assign the read data units to sequential storage positions of the current frame following those at which the data units of the second data portion are stored;
  d) a cell failure determination unit adapted to detect that in a current cell block a second type cell having a data frame delimiter pointer value is missing and adapted to issue a cell loss indication about this second type cell loss;
  e) a determining and memorizing unit adapted to determine and memorize the sequence number of the missing second type cell and to determine and memorize the number PTR' of data units in the missing second type cell which still belong to the current frame on the basis of the read data frame delimiter pointer value, the sequence number of the read second type cell and the number of data units per frame; and
  f1) when the cell loss indication is received from the cell failure determination unit, said assignment unit being adapted to assign a number PTR' of dummy data units to the final sequential storage positions of the current frame;
to assign a number NDU2-PTR' of dummy data units to the first sequential storage positions of the next frame; and f3) said read unit being adapted to read NDU1 data units from the first type cell having the sequence number following the determined sequence number of the missing second type cell and said assignment unit being further adapted to assign the data units to the sequential storage positions in the next frame following those of the dummy data units.

7. A device according to claim 1,
wherein
said second type cell further includes in said pointer value field:
a dummy pointer value indicating that neither a start nor an end of frame occurs in the data block in which the second type cell is included; or
a frame&block end pointer value indicating that the end of the frame coincides with the end of the data block;
said device further comprising:
a) NC1+1 counters $C_1, C_2, \ldots, C_{SN+N}, C_{NC1+1}$, one for each sequence number SN;
b) a counter setting unit adapted to set said NC1+1 counters $C_{SN+N}$ respectively assigned to the (SN+N)-th sequence number, wherein N=1,2, ..., NC1+1 and if (SN+N)>NC1 then N=N−(NC1+1), respectively to counter values $CV_{SN+1}=(NF-NDU2+PTR)$, $CV_{SN+2}=CV_{SN+1}-NDU1, \ldots, CV_{SN+N}=CV_M-NDU1$, wherein M=SN+N−1 if SN+N−1≧0 and M=(SN+N−1)+(NC1+1) if SN+N−1<0 and if CV<0 then CV=NF−CV, and
said assignment unit assigning NDU2-PTR data units of the second data portion of the second type cell to sequential NDU2-PTR storage positions at the beginning of the current frame;

c) said reception unit receiving a next cell, said read unit reading the sequence number SN of the next cell, reading NDU data units from the data portion of the next cell, wherein x=1 if the sequence number SN corresponds to a first type cell and x=2 if the sequence number SN corresponds to a second type cell having a dummy pointer value or a block&frame end pointer value, and said setting unit reading the counter value $CV_{SN}$ of the counter corresponding to the SN-th sequence number SN;

d) said setting unit setting said NC1+1 counters $C_{SN+N}$ respectively assigned to the (SN+N)-th sequence number, wherein N=1,2, ..., NC1+1 and if (SN+N)>NC1 then N=N−(NC1+1), respectively to counter values $CV_{SN+1}=(CV_{SN}-NDUx)$, $CV_{SN+2}=CV_{SN+1}-NDUx, \ldots, CV_{SN+N}=CV_M-NDUx$, wherein M=SN+N−1 if SN+N−1≧0 and M=(SN+N−1)+(NC1+1) if SN+N−1<0 and if CV<0 then CV=NF−CV, and
said assigning unit assigning the read NDU data units to sequential storage positions of the current frame;

e) said read unit and said assignment unit repeating said reading and assigning in features c) and d) until said cell failure unit issues an indication that in a current cell block a second type cell having a data frame delimiter pointer value PTR is missing, wherein f) if the indication is received that the second type cell is missing, said setting unit reads the counter value $CV_{SN}$ of the counter $CV_{SN}$ corresponding to sequence number SN of the second type cell, said assignment unit assigning $CV_{SN}$ dummy data units to the $CV_{SN}$ sequential storage positions at the end of the current frame, and assigning at least NDU2−$CV_{SN}$ dummy data units to the NDU2−$CV_{SN}$ sequential storage positions at the beginning of the next frame.

\* \* \* \* \*